(12) United States Patent
Kyuma

(10) Patent No.: US 10,118,102 B2
(45) Date of Patent: Nov. 6, 2018

(54) INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventor: Koichi Kyuma, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/638,554

(22) Filed: Jun. 30, 2017

(65) Prior Publication Data
US 2018/0193757 A1    Jul. 12, 2018

(30) Foreign Application Priority Data
Jan. 10, 2017    (JP) ................. 2017-001841

(51) Int. Cl.
| | |
|---|---|
| H04M 1/00 | (2006.01) |
| A63F 13/98 | (2014.01) |
| A63F 13/235 | (2014.01) |
| A63F 13/285 | (2014.01) |
| A63F 13/211 | (2014.01) |

(52) U.S. Cl.
CPC ............ *A63F 13/98* (2014.09); *A63F 13/211* (2014.09); *A63F 13/235* (2014.09); *A63F 13/285* (2014.09); *A63F 2300/1043* (2013.01)

(58) Field of Classification Search
CPC ...... A63F 13/98; A63F 13/211; A63F 13/235; A63F 13/285
USPC ....................................... 455/556.1
See application file for complete search history.

(56) References Cited

U.S. PATENT DOCUMENTS

| | | | | |
|---|---|---|---|---|
| 6,679,776 | B1 * | 1/2004 | Nishiumi ................ | A63F 13/06 273/148 B |
| 2011/0190052 | A1 | 8/2011 | Takeda et al. | |

FOREIGN PATENT DOCUMENTS

JP    2012-110670    6/2012

* cited by examiner

*Primary Examiner* — Sanh D Phu
(74) *Attorney, Agent, or Firm* — Nixon & Vanderhye PC

(57) ABSTRACT

First vibration data is generated using first operation data corresponding to an operation on a direction input unit, and second vibration data is generated using second operation data corresponding to an operation on a press button. Then, a first vibrator of a first operation device is vibrated in accordance with the first vibration data, and a second vibrator of a second operation device is vibrated in accordance with the second vibration data.

18 Claims, 16 Drawing Sheets

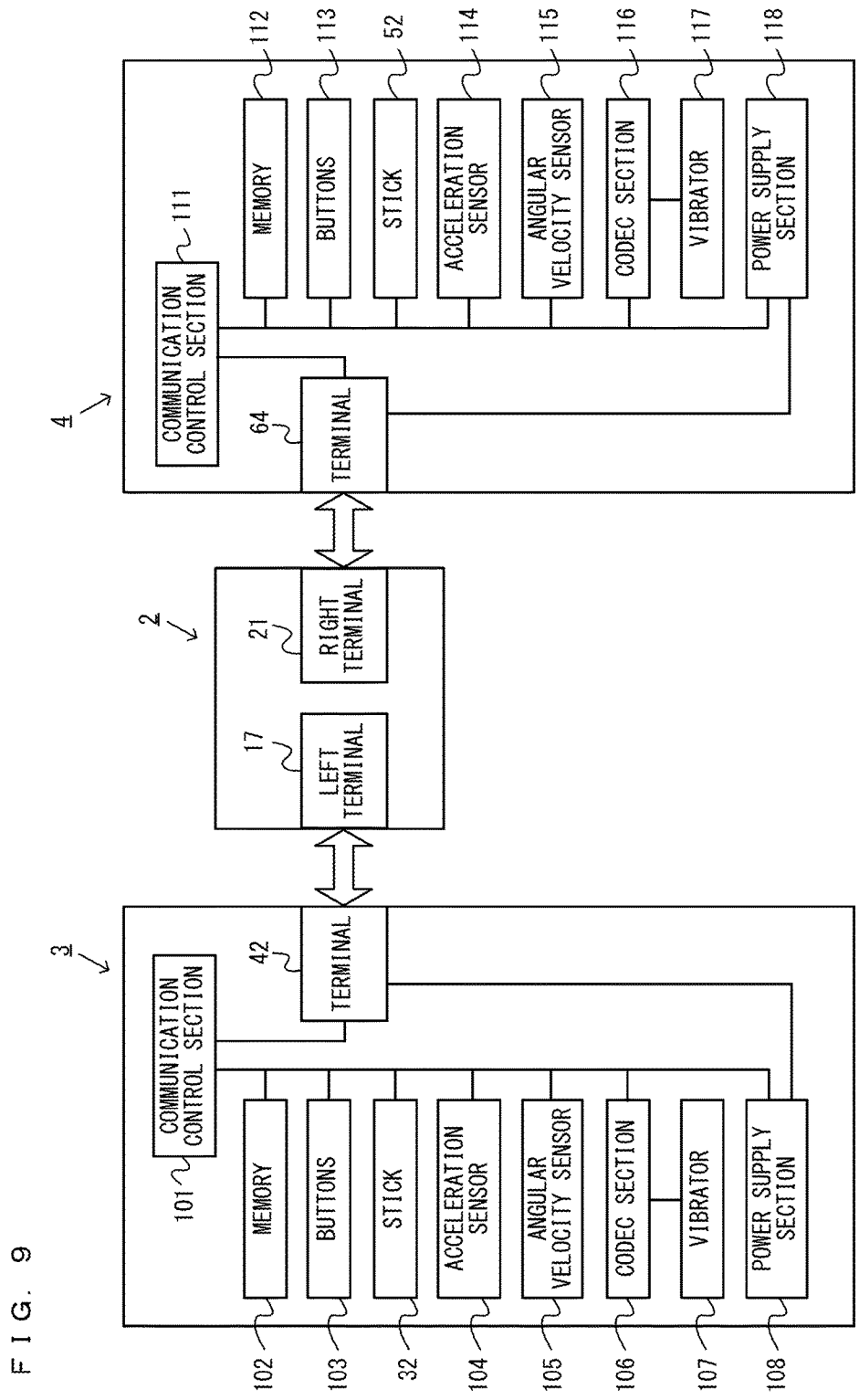
F I G. 9

FIG. 12
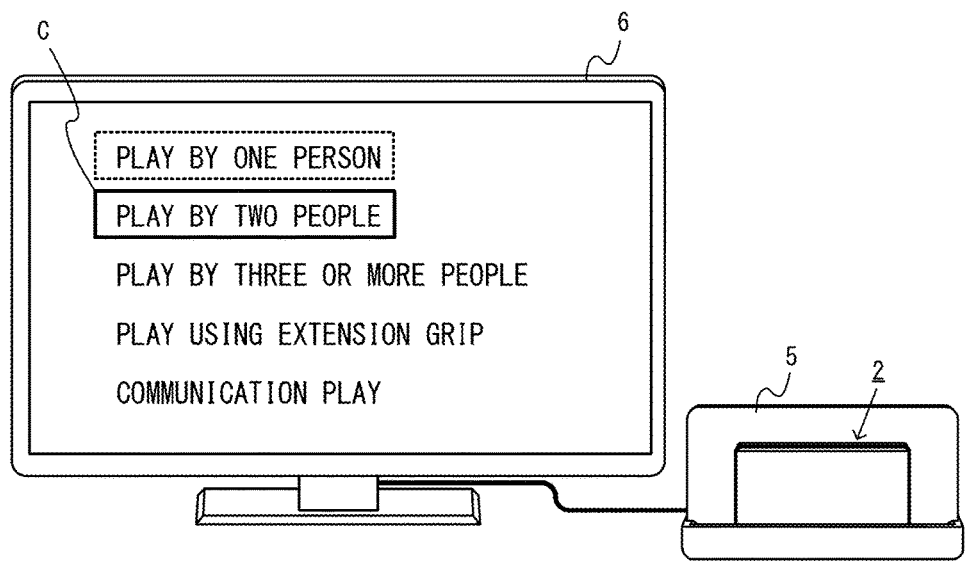
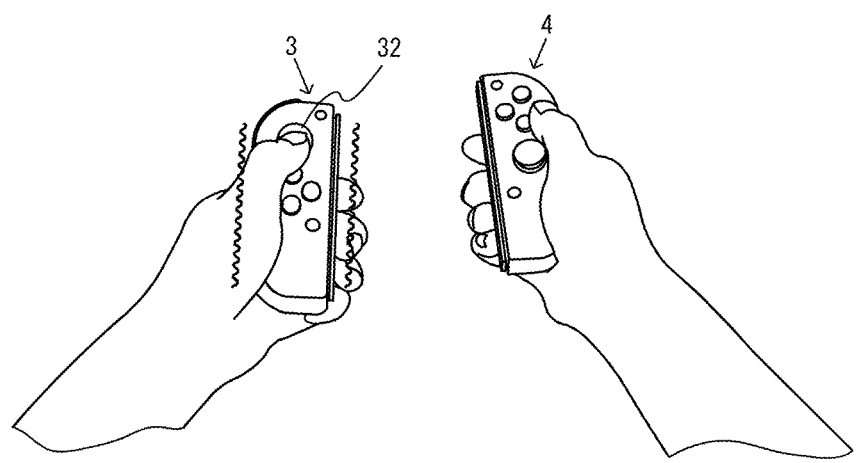

F I G. 1 4
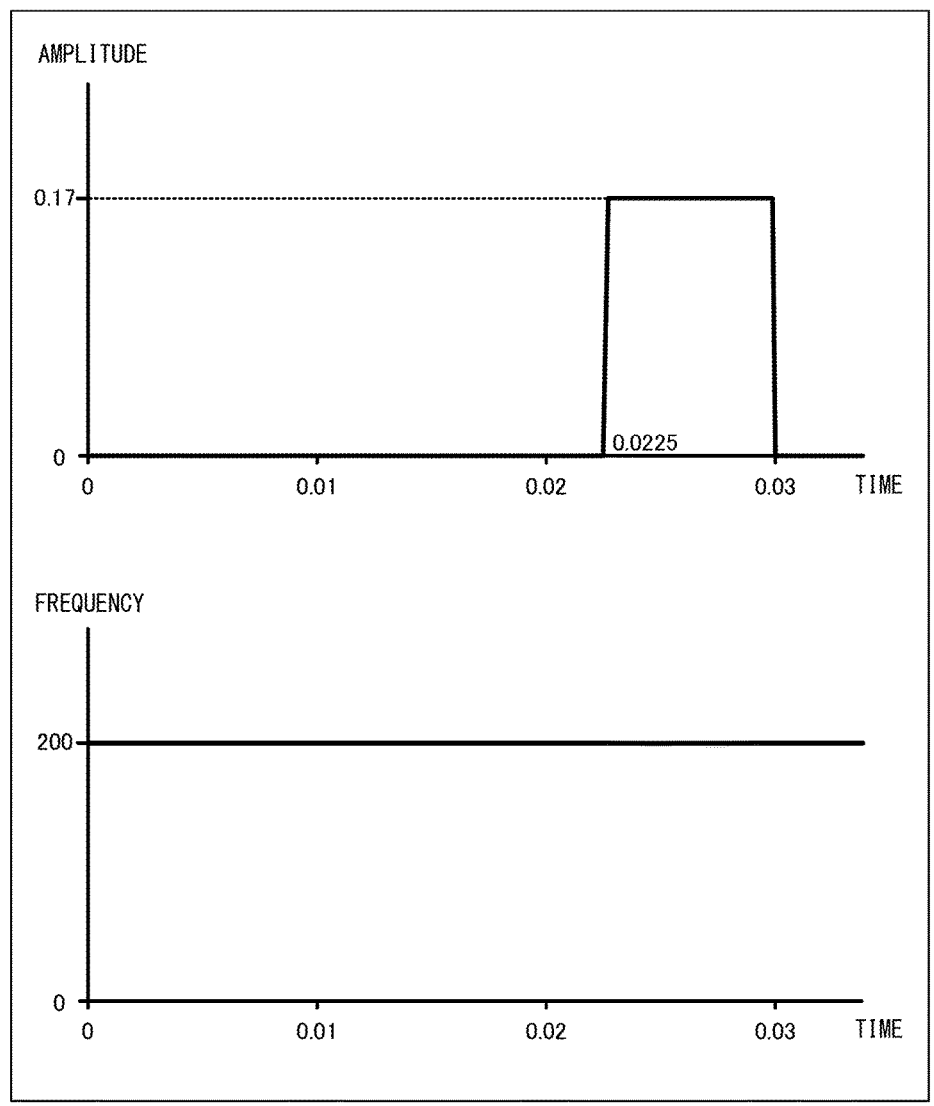

F I G. 1 5
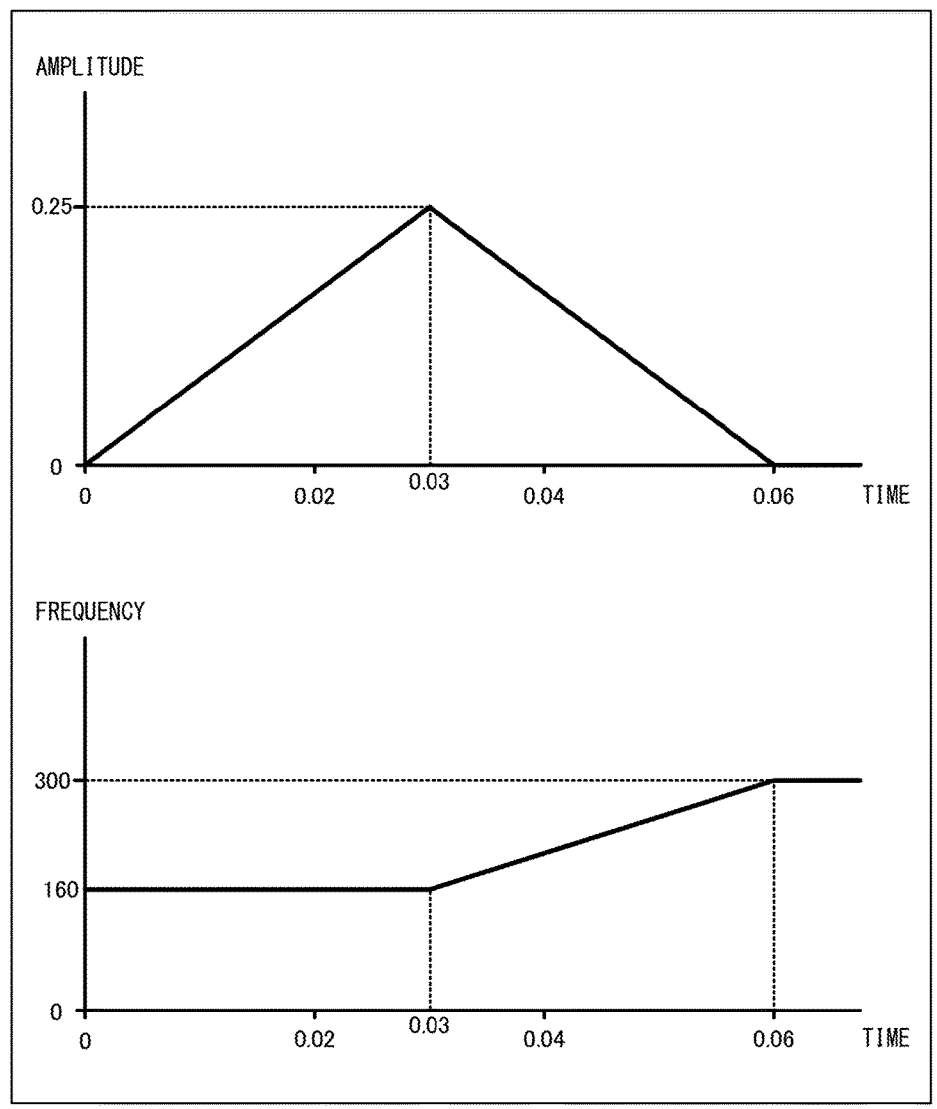

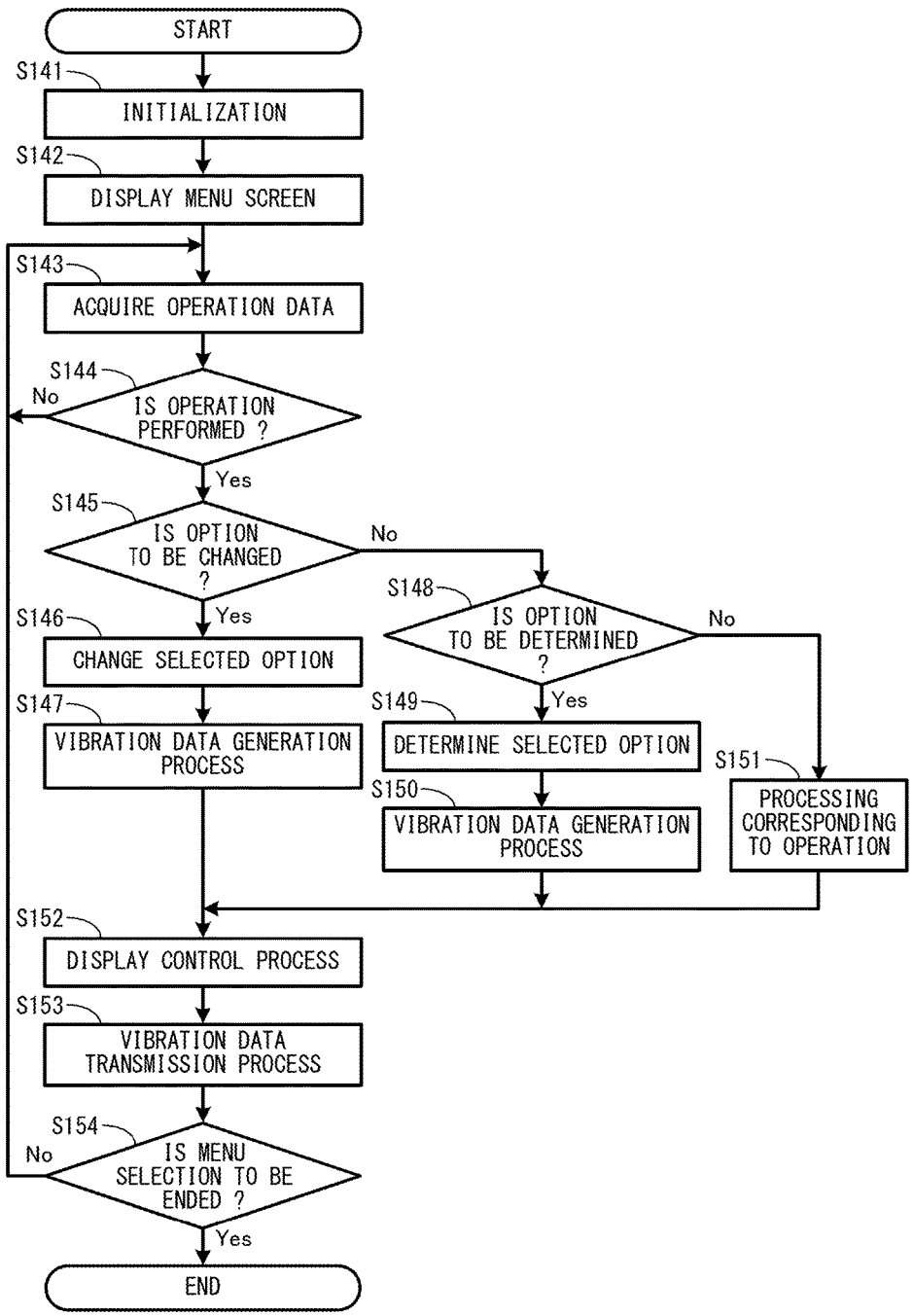

INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2017-001841, filed on Jan. 10, 2017, is incorporated herein by reference.

FIELD

The technology shown here relates to an information processing system, an information processing apparatus, a storage medium having stored therein an information processing program, and an information processing method in which an operation can be performed using an operation device.

BACKGROUND AND SUMMARY

Conventionally, there is a game system where an operation can be performed using a game controller in which a direction input section and a press button are provided.

In the game system, however, even if the direction input section or the press button provided in the game controller is operated, no regard is given to the process of appropriately vibrating the game controller in accordance with this operation. That is, in the game system, no regard is given to the process of appropriately controlling a vibrator in accordance with an operation using the direction input section and the press button of the game controller.

Therefore, it is an object of an exemplary embodiment to provide an information processing system, an information processing apparatus, a storage medium having stored therein an information processing program, and an information processing method that are capable of, in a system where an operation can be performed using an operation device, imparting an appropriate vibration in accordance with an operation using the operation device.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing system according to the exemplary embodiment, an information processing system includes a first operation device including a first vibrator, a second operation device including a second vibrator, and an information processing apparatus configured to communicate with each of the first operation device and the second operation device, the first operation device comprising: a direction input unit in a housing of the first operation device; and a computer processor configured to: transmit first operation data corresponding to an operation on the direction input unit to the information processing apparatus, the second operation device comprising: a press button in a housing of the second operation device; and a computer processor configured to: transmit second operation data corresponding to an operation on the press button to the information processing apparatus, the information processing apparatus comprising a computer processor configured to: set an operation method using the first operation device and the second operation device as a set; acquire the first operation data and the second operation data; generate first vibration data using the first operation data and generate second vibration data using the second operation data; and transmit the first vibration data to the first operation device and transmit the second vibration data to the second operation device set in the same set as the first operation device in the setting of the operation method, the computer processor of the first operation device further configured to: vibrate the first vibrator in accordance with the first vibration data, the computer processor of the second operation device further configured to: vibrate the second vibrator in accordance with the second vibration data.

Based on the above, when an operation is performed using both a first operation device and a second operation device, an operation device subjected to the operation vibrates. Thus, it is possible to appropriately vibrate an operation device in accordance with an operation.

Further, in the generation of the vibration data, the first vibration data may be generated using as a trigger the fact that a valid operation is performed on the direction input unit using the first operation data, and the second vibration data may be generated using as a trigger the fact that a valid operation is performed on the press button using the second operation data.

Based on the above, when an operation is performed using both the first operation device and the second operation device, an operation device subjected to a valid operation vibrates using this operation as a trigger. Thus, it is possible to appropriately vibrate an operation device in accordance with an operation.

Further, the direction input unit may include an analog stick for outputting the first operation data corresponding to a tilt direction and a tilt angle of the stick operated by a user.

Based on the above, it is possible to vibrate the first operation device in accordance with a tilt operation on an analog stick.

Further, a vibration waveform indicated by the first vibration data may be different from a vibration waveform indicated by the second vibration data.

Based on the above, it is possible to vibrate the first operation device and the second operation device based on different vibration waveforms.

Further, the vibration waveform indicated by the first vibration data may be different from the vibration waveform indicated by the second vibration data in at least one of a magnitude of an amplitude, a frequency, a vibration period, time intervals at which a vibration is intermittently imparted, and vibration start timing.

Based on the above, it is possible to vibrate the first operation device and/or the second operation device based on various vibration waveforms.

Further, in the generation of the vibration data, at least one of the first vibration data and the second vibration data may be generated such that a vibration starts after a predetermined time elapses since the trigger.

Further, in the generation of the vibration data, at least one of the first vibration data and the second vibration data may be generated such that a local maximum value of an amplitude of the vibration arrives after a predetermined time elapses since the trigger.

Based on the above, a user holding an operation device subjected to an operation easily distinguishes a vibration from a vibration generated in an operation device by the motion when a direction indication unit or a press button is operated. Thus, the user feels a vibration more easily than in a case where a vibration is imparted at the same timing as this operation.

Further, the computer processor of the information processing apparatus may be further configured to: generate and output a first sound effect using as a trigger the fact that a valid operation is performed on the direction input unit, and generate and output a second sound effect using as a trigger the fact that a valid operation is performed on the press button, and in the generation of the vibration data, the first vibration data may be generated such that a vibration starts or a local maximum value of an amplitude of the vibration arrives after a predetermined time elapse since output of the first sound effect is started, and/or the second vibration data may be generated such that a vibration starts or a local maximum value of an amplitude of the vibration arrives after a predetermined time elapses since output of the second sound effect is started.

Based on the above, it is possible to impart to the first operation device and the second operation device a vibration delayed by a predetermined time from a sound effect to be output in accordance with an operation.

Further, the first operation device and the second operation device may be physically separate from each other.

Based on the above, it is possible to impart a vibration to each of a plurality of operation devices physically separate from each other.

Further, the computer processor of the information processing apparatus may be further configured to: perform information processing for selecting any one of a plurality of items in accordance with the first operation data and determining the selected item in accordance with the second operation data.

Based on the above, it is possible to vibrate, using as a trigger an operation for performing information processing, an operation device subjected to this operation.

Further, in the generation of the vibration data, the first vibration data may be generated every time the selected item is changed, and the second vibration data may be generated in accordance with the fact that the selected item is determined.

Based on the above, when information processing for selecting one of a plurality of options and determining the option is performed, it is possible to vibrate an operation device in accordance with the operation of changing the option and the operation of determining the selected option.

Further, in the performance of the information processing, the computer processor of the information processing apparatus may be further configured to: perform predetermined game processing; and display a plurality of options on a display device before a game to be subjected to the game processing is started, and in the generation of the vibration data, the first vibration data may be generated every time the selected option is changed, and the second vibration data may be generated in accordance with the fact that the selected option is determined.

Based on the above, it is possible to vibrate an operation device in accordance with the operation of selecting and determining an option before a game is started.

Further, the computer processor of the information processing apparatus may be further configured to: perform first information processing in accordance with the first operation data and perform second information processing in accordance with the second operation data, and in the generation of the vibration data, the first vibration data may be generated in accordance with a content of the first information processing, and the second vibration data may be generated in accordance with a content of the second information processing.

Based on the above, it is possible to vibrate each of the first operation device and the second operation device in accordance with the content of information processing.

Further, in another exemplary configuration of the information processing system according to the exemplary embodiment, an information processing system includes an operation device including a vibrator, and an information processing apparatus configured to communicate with the operation device, the operation device comprising: a direction input unit in a housing of the operation device; and a computer processor configured to: transmit operation data to the information processing apparatus in accordance with an operation on the direction input unit, the information processing apparatus comprising a computer processor configured to: acquire the operation data; perform predetermined information processing in accordance with the operation data; in accordance with a content of the predetermined information processing, determine whether or not a vibration is to be delayed from the operation on the direction input unit, thereby generating vibration data based on the determination; and transmit the vibration data to the operation device, the computer processor of the operation device further configured to: vibrate the vibrator in accordance with the vibration data.

Based on the above, when an operation is performed using an operation device, it is determined whether or not a vibration is to be delayed from operation timing in accordance with the content of information processing corresponding to an operation. Thus, it is possible to appropriately vibrate an operation device in accordance with an operation.

Further, the exemplary embodiment may be carried out in the forms of an information processing apparatus, a storage medium having stored therein an information processing program, and an information processing method.

According to the exemplary embodiment, when an operation is performed using an operation device, it is possible to appropriately vibrate the operation device in accordance with the operation.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 9 is a block diagram showing a non-limiting example of the internal configuration of the information processing system 1;

FIG. 12 is a diagram showing a non-limiting example of the state where the single user uses the information processing system 1 by holding the set of the left controller 3 and the right controller 4 in the separate state;

FIG. 14 is a diagram showing a non-limiting example of a vibration of a controller corresponding to the operation of changing a selected option;

FIG. 15 is a diagram showing a non-limiting example of a vibration of a controller corresponding to the operation of determining an option;

FIG. 17 is a flow chart showing a non-limiting example of information processing executed by the information processing system 1.

DETAILED DESCRIPTION OF NON-LIMITING EXAMPLE EMBODIMENTS

Figure 1:
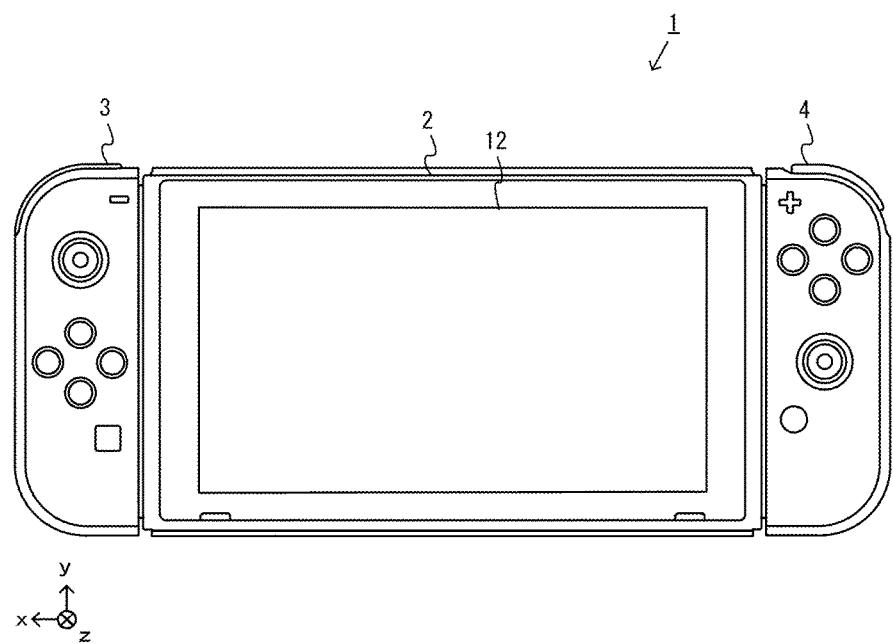
FIG. 1 is a diagram showing a non-limiting example of the state where a left controller 3 and a right controller 4 are attached to a main body apparatus 2 in an example of an information processing system 1 according to an exemplary embodiment.

A description is given below of an information processing system, an information processing apparatus, an information processing program, and an information processing method according to an exemplary embodiment. In the exemplary embodiment, an information processing system 1 includes a main body apparatus 2 (information processing apparatus; which functions as a game apparatus main body in the exemplary embodiment) 2, a left controller 3, and a right controller 4. Further, in another form, the information processing system may further include a cradle 5 (see FIGS. 6 and 7 and the like) in addition to the above configuration. In the information processing system 1 according to the exemplary embodiment, the left controller 3 and the right controller 4 are attachable to and detachable from the main body apparatus 2. The information processing system 1 can be used as a unified apparatus obtained by attaching each of the left controller 3 and the right controller 4 to the main body apparatus 2. Further, the main body apparatus 2, the left controller 3, and the right controller 4 can also be used as separate bodies (see FIG. 2). Further, the information processing system 1 can be used in the form in which an image is displayed on the main body apparatus 2, and in the form in which an image is displayed on another display device such as a television. In the first form, the information processing system 1 can be used as a mobile apparatus (e.g., a mobile game apparatus). Further, in the second form, the information processing system 1 can be used as a stationary apparatus (e.g., a stationary game apparatus).

FIG. 1 is a diagram showing the state where the left controller 3 and the right controller 4 are attached to the main body apparatus 2 in an example of the information processing system 1 according to the exemplary embodiment. As shown in FIG. 1, the information processing system 1 includes the main body apparatus 2, the left controller 3, and the right controller 4. Each of the left controller 3 and the right controller 4 is attached to and unified with the main body apparatus 2. The main body apparatus 2 is an apparatus for performing various processes (e.g., game processing) in the information processing system 1. The main body apparatus 2 includes a display 12. Each of the left controller 3 and the right controller 4 is an apparatus including operation sections with which a user provides inputs. It should be noted that the information processing system 1 has a horizontally long shape. That is, in the exemplary embodiment, the longitudinal direction of a main surface of the information processing system 1 is referred to as a "horizontal direction" (also as a "left-right direction"), the short direction of the main surface is referred to as a "vertical direction" (also as an "up-down direction"), and a direction perpendicular to the main surface is referred to as a depth direction (also as a "front-back direction"). Further, to facilitate the understanding of directions in the information processing system 1, three axial (xyz-axis) directions are defined for the information processing system 1. Specifically, as shown in FIG. 1, in the information processing system 1, the depth direction of the display 12 from a front surface, on which the display 12 is provided, to a back surface is defined as a positive z-axis direction. In the horizontal direction perpendicular to the depth direction, the direction from the right to left (the direction from the attachment position of the right controller 4 to the attachment position of the left controller 3) is defined as a positive x-axis direction. In the up-down direction perpendicular to the depth direction and the horizontal direction, the direction upward along the display 12 is defined as a positive y-axis direction.

Figure 2:
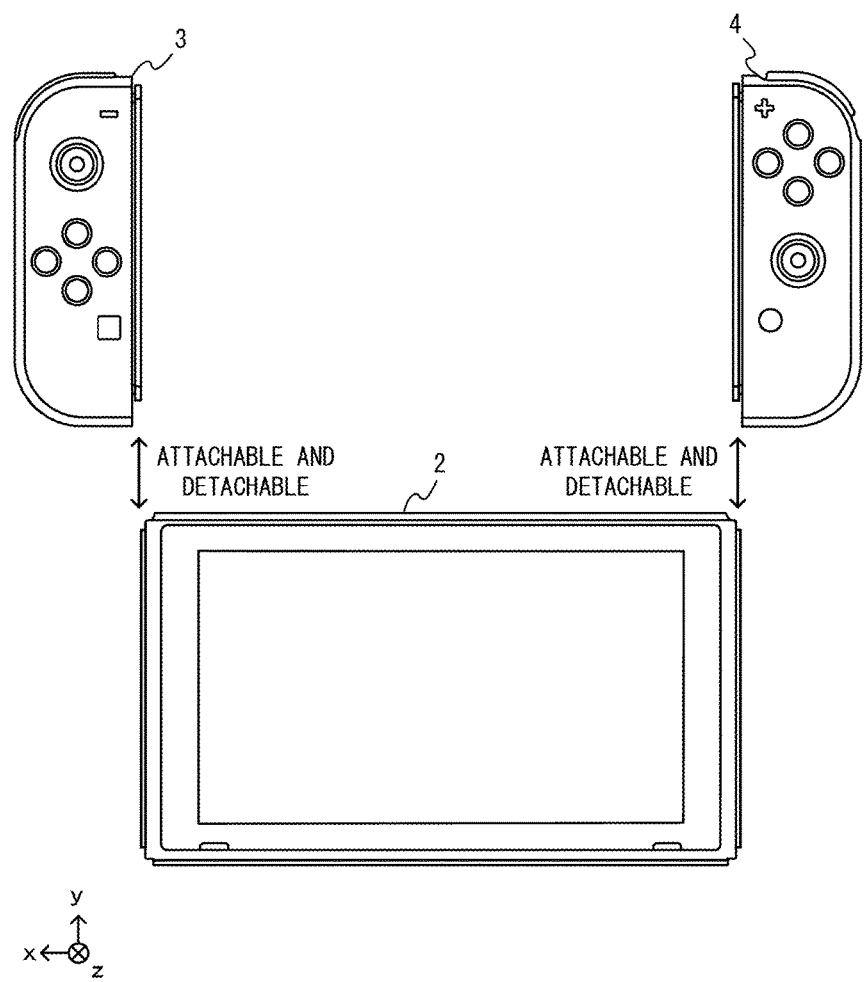
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller". It should be noted that in the exemplary embodiment, an "operation device" operated by a single user may be a single controller (e.g., one of the left controller 3 and the right controller 4) or a plurality of controllers (e.g., both the left controller 3 and the right controller 4, or these controllers and another controller), and the "operation device" can be configured by one or more controllers. A description is given below of examples of the specific configurations of the main body apparatus 2, the left controller 3, and the right controller 4.

Figure 3:
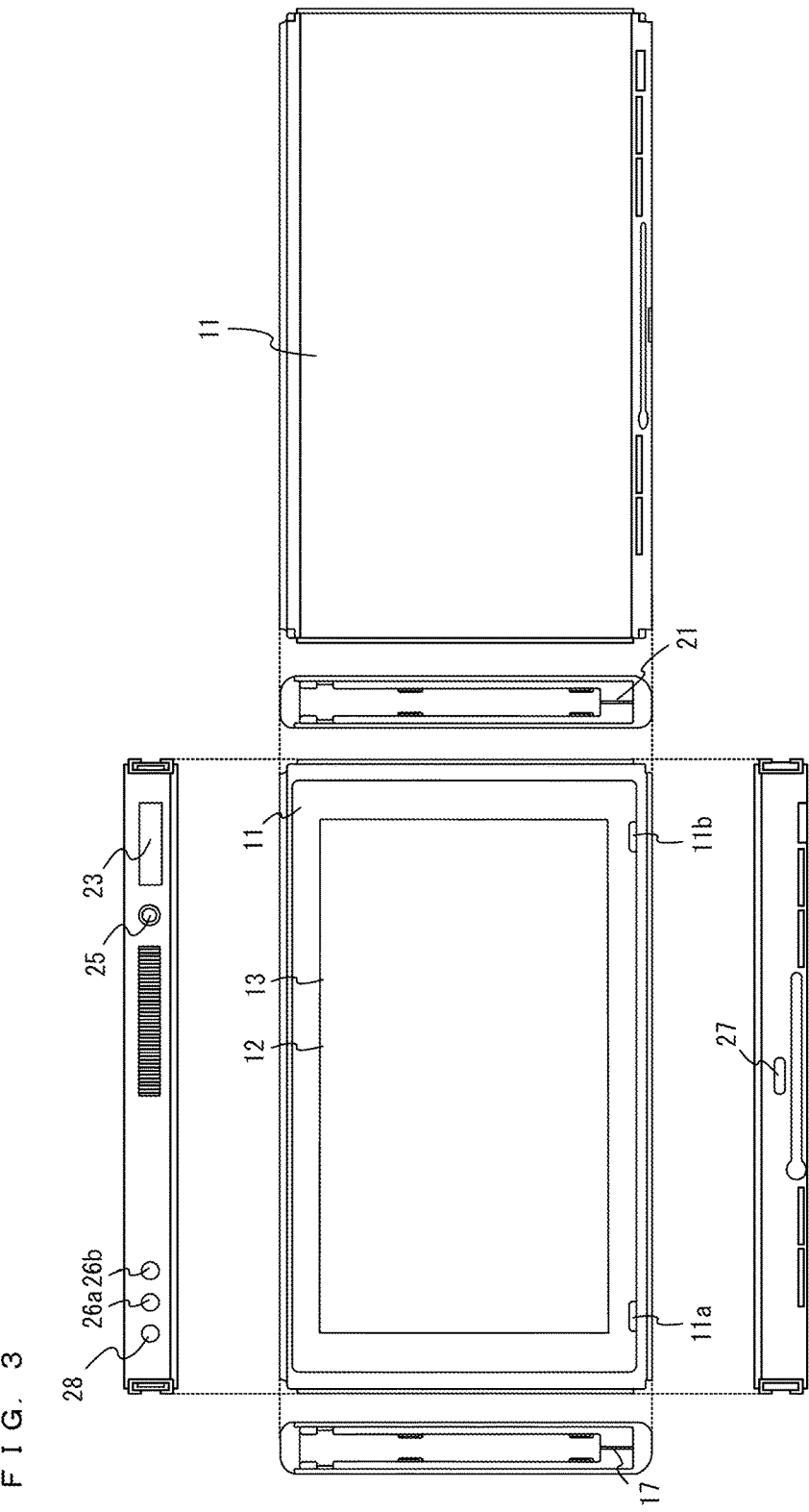
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape. In the exemplary embodiment, the housing 11 has a horizontally long shape. The main body apparatus 2 can be used in the orientation in which the main body apparatus 2 is horizontally long. Further, the main body apparatus 2 can also be used in the orientation in which the main body apparatus 2 is vertically long. In this case, the housing 11 may be considered as having a vertically long shape.

It should be noted that the housing 11 are optional. As an example, the housing 11 may have a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image (a still image or a moving image) acquired or generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 8) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17 for the main body apparatus 2 to perform wired communication with the left controller 3, and a right terminal 21 for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the information processing system 1 and an information processing apparatus of the same type as the information processing system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28 and sound volume buttons 26a and 26b.

The main body apparatus 2 includes a lower terminal 27. The lower terminal 27 is a terminal for the main body apparatus 2 to communicate with the cradle 5, which will be described later. In the exemplary embodiment, the lower terminal 27 is a USB connector (more specifically, a female connector).

Figure 4:
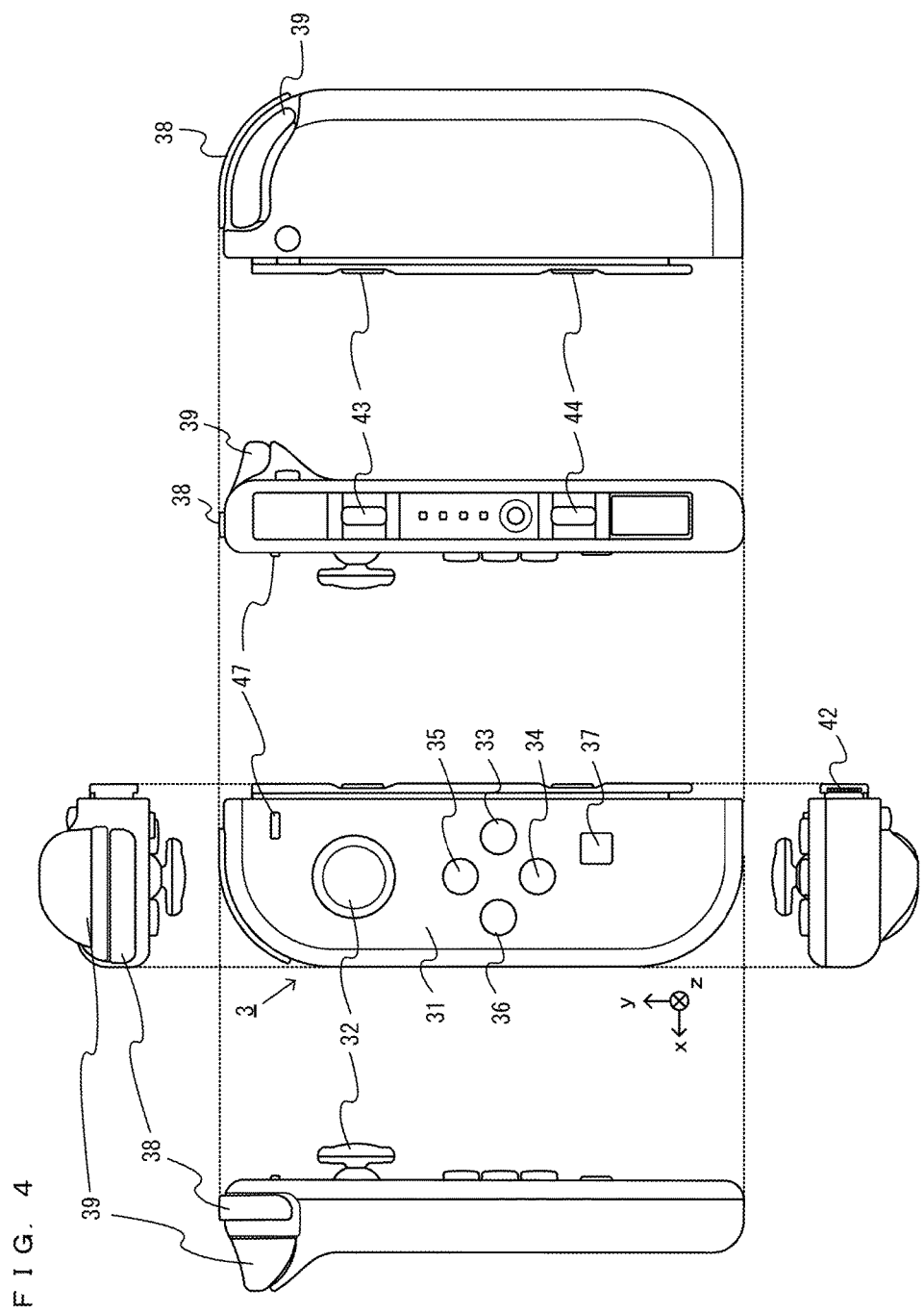
FIG. 4 is six orthogonal views showing a non-limiting example of the left controller 3.

FIG. 4 is six orthogonal views showing an example of the left controller 3, and xyz directions shown in FIG. 4 indicate three axial directions in a front view of the left controller 3. As shown in FIG. 4, the left controller 3 includes a housing 31. In the exemplary embodiment, the housing 31 has a vertically long shape, i.e., is shaped to be long in the up-down direction (i.e., the y-axis direction shown in FIG. 1). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. First, the left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
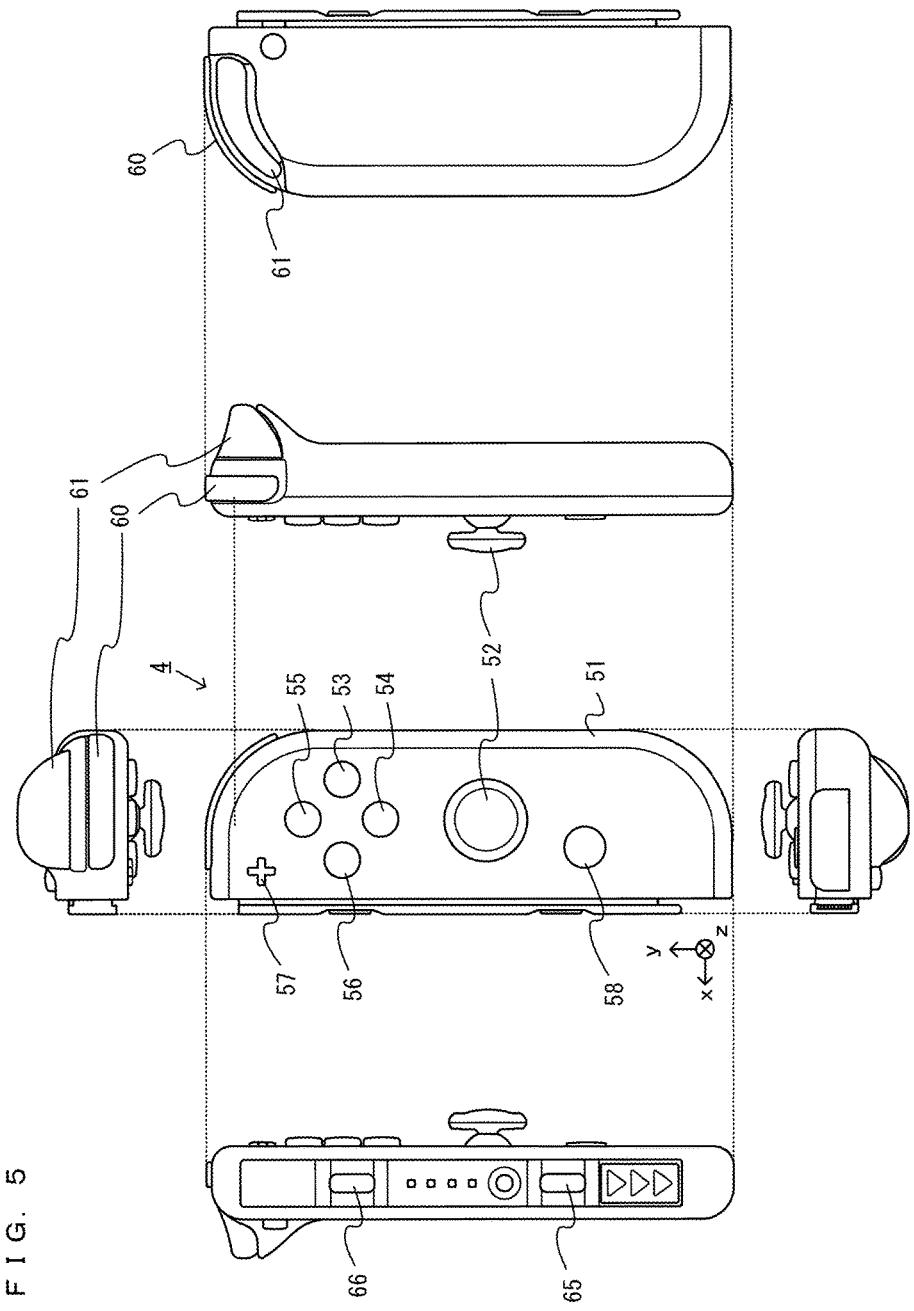
FIG. 5 is six orthogonal views showing a non-limiting example of the right controller 4.

FIG. 5 is six orthogonal views showing an example of the right controller 4, and xyz directions shown in FIG. 5 indicate three axial directions in a front view of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
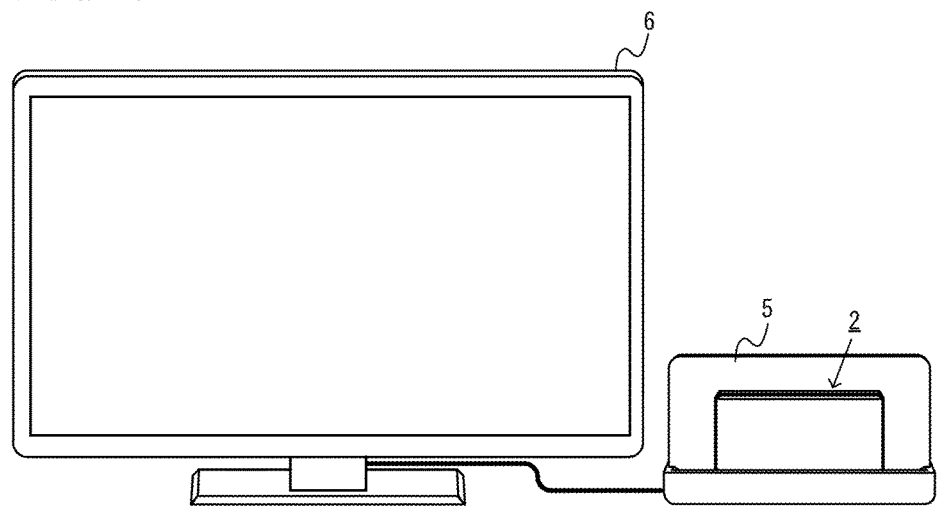
FIG. 6 is a diagram showing the overall configuration of another non-limiting example of the information processing system according to the exemplary embodiment.

FIG. 6 is a diagram showing the overall configuration of another example of the information processing system according to the exemplary embodiment. As shown in FIG. 6, as an example, the unified apparatus obtained by attaching the left controller 3 and the right controller 4 to the main body apparatus 2 can be mounted on the cradle 5. Further, as yet another example, only the main body apparatus 2 can also be mounted on the cradle 5 in the state where the left controller 3 and the right controller 4 are detached from the main body apparatus 2. Further, the cradle 5 can communicate (through wired communication or wireless communication) with a stationary monitor 6 (e.g., a stationary television), which is an example of an external display device separate from the display 12. Although the details will be described later, when the unified apparatus or the main body apparatus 2 alone is mounted on the cradle 5, the information processing system can display on the stationary monitor 6 an image acquired or generated by the main body apparatus 2. Further, in the exemplary embodiment, the cradle 5 has the function of charging the unified apparatus or the main body apparatus 2 alone mounted on the cradle 5. Further, the cradle 5 has the function of a hub device (specifically, a USB hub).

Figure 7:
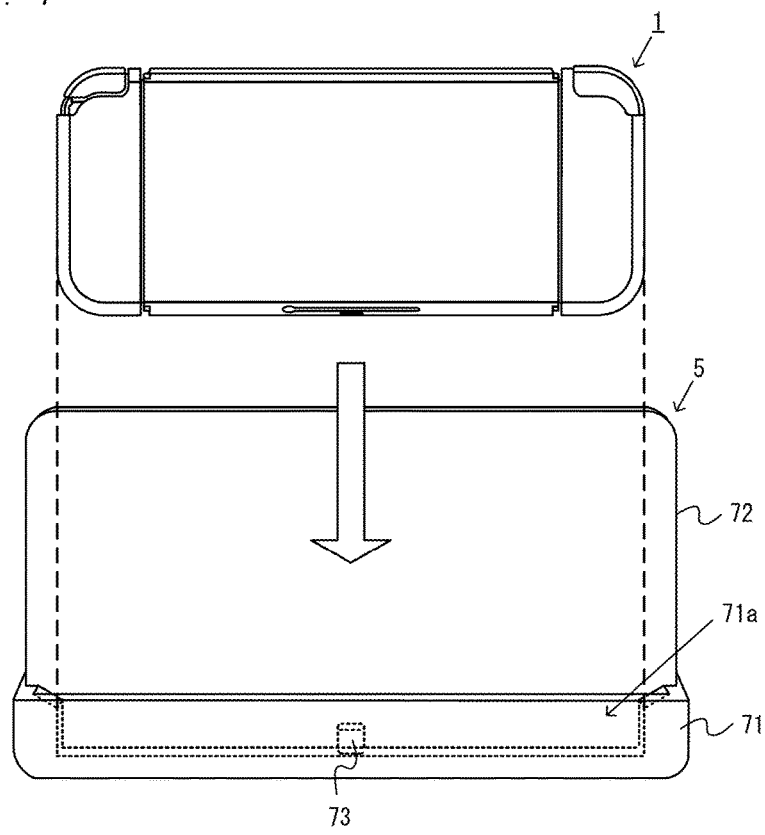
FIG. 7 is a diagram showing a non-limiting example of the external configuration of a cradle 5.

FIG. 7 is a diagram showing an example of the external configuration of the cradle 5. The cradle 5 includes a housing on which the unified apparatus or the main body apparatus 2 alone can be detachably mounted (or attached). In the exemplary embodiment, as shown in FIG. 7, the housing includes a first supporting portion 71, in which a groove 71a is formed, and an approximately planar second supporting portion 72.

As shown in FIG. 7, the groove 71a formed in the first supporting portion 71 has a shape corresponding to the shape of a lower portion of the unified apparatus. Specifically, the groove 71a is so shaped as to allow the lower portion of the unified apparatus to be inserted into the groove 71a, and more specifically, is so shaped as to approximately coincide with the lower portion of the main body apparatus 2. Thus, the lower portion of the unified apparatus is inserted into the groove 71a, whereby it is possible to mount the unified apparatus on the cradle 5. Further, the second supporting portion 72 supports a front surface of the unified apparatus (i.e., the surface on which the display 12 is provided) of which the lower portion is inserted into the groove 71a. With the second supporting portion 72, the cradle 5 can support the unified apparatus more stably. It should be noted that the shape of the housing shown in FIG. 7 is merely illustrative. In another exemplary embodiment, the housing of the cradle 5 may have any shape that allows the main body apparatus 2 to be mounted on the housing.

As shown in FIG. 7, further, the cradle 5 includes a main body terminal 73 for the cradle 5 to communicate with the unified apparatus. As shown in FIG. 7, the main body terminal 73 is provided on a bottom surface of the groove 71a, which is formed in the first supporting portion 71. More specifically, the main body terminal 73 is provided at the position where the lower terminal 27 of the main body apparatus 2 comes into contact with the main body terminal 73 when the unified apparatus is attached to the cradle 5. In the exemplary embodiment, the main body terminal 73 is a USB connector (more specifically, a male connector).

Figure 10:
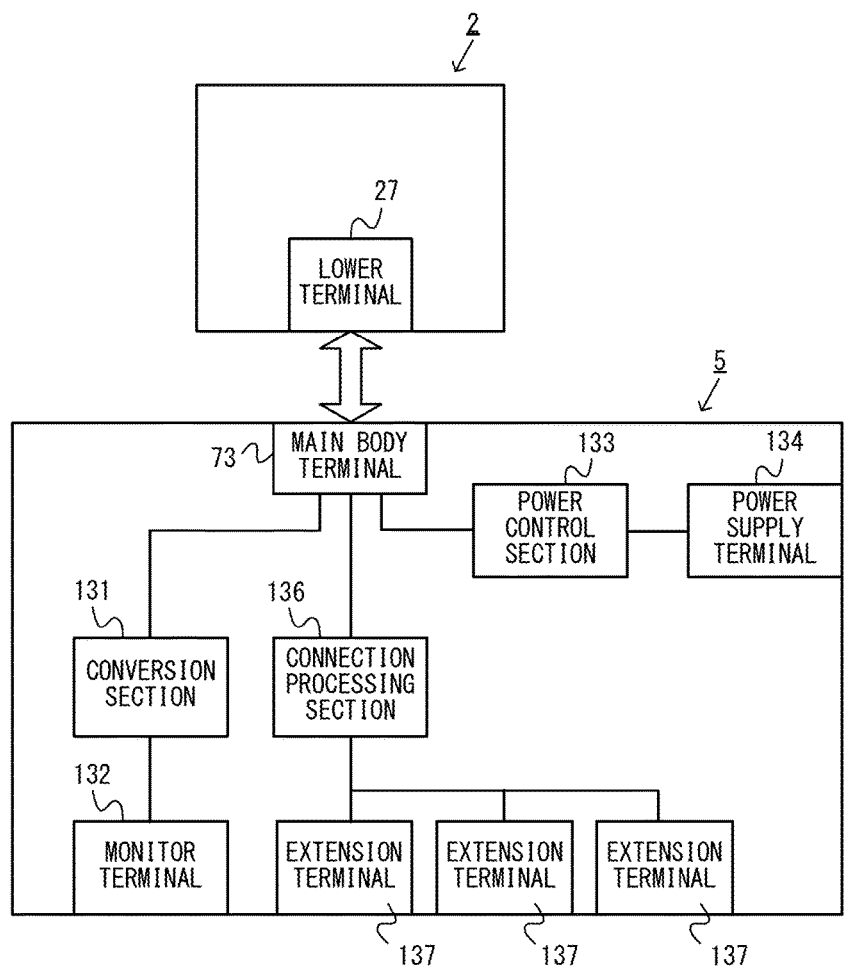
FIG. 10 is a block diagram showing a non-limiting example of the internal configuration of the cradle 5.

Although not shown in FIG. 7, the cradle 5 includes a terminal (includes a plurality of terminals, specifically, a monitor terminal 132, a power supply terminal 134, and extension terminals 137, which are shown in FIG. 10 in the exemplary embodiment) on a back surface of the housing. The details of these terminals will be described later.

Figure 8:
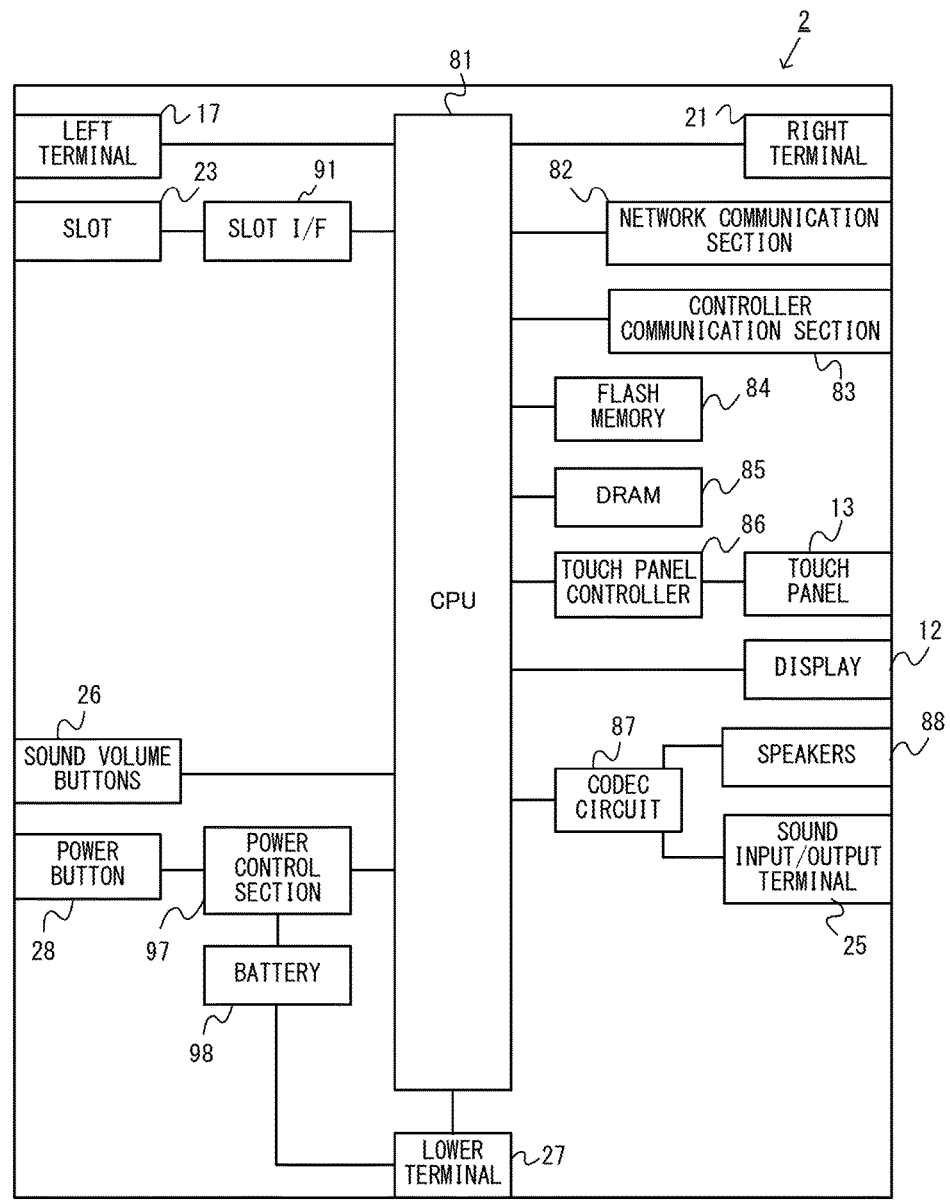
FIG. 8 is a block diagram showing a non-limiting example of the internal configuration of the main body apparatus 2.

FIG. 8 is a block diagram showing an example of the internal configuration of the main body apparatus 2. The main body apparatus 2 includes components 81 to 98 shown in FIG. 8 in addition to the components shown in FIG. 3. Some of the components 81 to 98 may be mounted as electronic components on an electronic circuit board and accommodated in the housing 11.

The main body apparatus 2 includes a CPU (Central Processing Unit) 81. The CPU 81 is an information processing section for executing various types of information processing to be executed by the main body apparatus 2. The CPU 81 executes an information processing program (e.g., a game program) stored in a storage section (specifically, an internal storage medium such as a flash memory 84, an external storage medium attached to the slot 23 or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the CPU 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the CPU 81. The slot I/F 91 is connected to the slot 23, and in accordance with an instruction from the CPU 81, reads and writes data from and to the predetermined type of storage medium (e.g., a dedicated memory card) attached to the slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The CPU 81 is connected to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle 5, the CPU 81 transmits data to the cradle 5 via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle 5, the main body apparatus 2 can output data (e.g., image data or sound data) to the stationary monitor 6 via the cradle 5.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, the user can provide inputs to the main body apparatus 2 using a plurality of left controllers 3 and a plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the CPU 81. The codec circuit 87 is a circuit for controlling the input and output of sound data to and from the speakers 88 and the sound input/output terminal 25. That is, if receiving sound data from the CPU 81, the codec circuit 87 outputs sound signals obtained by performing D/A conversion on the sound data to the speakers 88 or the sound input/output terminal 25. Consequently, sounds are output from the speakers 88 or a sound output section (e.g., earphones) connected to the sound input/output terminal 25. Further, if receiving a sound signal from the sound input/output terminal 25, the codec circuit 87 performs A/D conversion on the sound signal and outputs sound data in a predetermined format to the CPU 81. Further, the sound volume buttons 26 are connected to the CPU 81. Based on an input to the sound volume buttons 26, the CPU 81 controls the volume of sounds output from the speakers 88 or the sound output section.

The main body apparatus 2 includes a power control section 97 and a battery 98. The power control section 97 is connected to the battery 98 and the CPU 81. Further, although not shown in FIG. 8, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components.

Further, the battery 98 is connected to the lower terminal 27. When an external charging device (e.g., the cradle 5) is connected to the lower terminal 27, and power is supplied to the main body apparatus 2 via the lower terminal 27, the battery 98 is charged with the supplied power.

FIG. 9 is a block diagram showing an example of the internal configuration of the information processing system 1. It should be noted that the details of the internal configuration of the main body apparatus 2 in the information processing system 1 are shown in FIG. 8 and therefore are omitted in FIG. 9.

The left controller 3 includes a communication control section 101, which communicates with the main body apparatus 2. As shown in FIG. 9, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, and 44). Further, the left controller 3 includes the analog stick ("stick" in FIG. 9) 32. Each of the buttons 103 and the analog stick 32 outputs information regarding an operation performed on itself to the communication control section 101 repeatedly at appropriate timing.

The left controller 3 includes an acceleration sensor 104. In the exemplary embodiment, the acceleration sensor 104 detects the magnitudes of linear accelerations along predetermined three axial (e.g., xyz axes shown in FIG. 4) directions. It should be noted that the acceleration sensor 104 may detect an acceleration along one axial direction or accelerations along two axial directions. Further, the left controller 3 includes an angular velocity sensor 105. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results by the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 by amplifying the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, information indicating the waveform itself may be transmitted. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 9, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections (specifically, buttons 113, the analog stick 52, an acceleration sensor 114, and an angular velocity sensor 115) of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

FIG. 10 is a block diagram showing an example of the internal configuration of the cradle 5. It should be noted that the details of the internal configuration of the main body apparatus 2 are shown in FIG. 8 and therefore are omitted in FIG. 10.

As shown in FIG. 10, the cradle 5 includes a conversion section 131 and a monitor terminal 132. The conversion section 131 is connected to the main body terminal 73 and the monitor terminal 132. The conversion section 131 converts the formats of signals of an image (or video) and a sound received from the main body apparatus 2 into formats in which the image and the sound are output to the stationary monitor 6. Here, in the exemplary embodiment, the main body apparatus 2 outputs signals of an image and a sound as display port signals (i.e., signals compliant with the DisplayPort standard) to the cradle 5. Further, in the exemplary embodiment, as the communication between the cradle 5 and the stationary monitor 6, communication based on the HDMI (registered trademark) standard is used. That is, the monitor terminal 132 is an HDMI terminal, and the cradle 5 and the stationary monitor 6 are connected together by an HDMI cable. Then, the conversion section 131 converts the display port signals (specifically, the signals representing the video and the sound) received from the main body apparatus 2 via the main body terminal 73 into HDMI signals. The converted HDMI signals are output to the stationary monitor 6 via the monitor terminal 132.

The cradle 5 includes a power control section 133 and a power supply terminal 134. The power supply terminal 134 is a terminal for connecting a charging device (e.g., an AC adapter or the like) (not shown). In the exemplary embodiment, an AC adapter is connected to the power supply terminal 134, and mains electricity is supplied to the cradle 5. When the main body apparatus 2 is attached to the cradle 5, the power control section 133 supplies power from the power supply terminal 134 to the main body apparatus 2 via the main body terminal 73. Consequently, the battery 98 of the main body apparatus 2 is charged.

Further, the cradle 5 includes a connection processing section 136 and extension terminals 137. Each of the extension terminals 137 is a terminal for connecting to another apparatus. In the exemplary embodiment, the cradle 5 includes a plurality of (more specifically, three) USB terminals as the extension terminals 137. The connection processing section 136 is connected to the main body terminal 73 and the extension terminals 137. The connection processing section 136 has a function as a USB hub and for example, manages the communication between an apparatus connected to each of the extension terminals 137 and the main body apparatus 2 connected to the main body terminal 73 (i.e., transmits a signal from a certain apparatus to another apparatus by appropriately distributing the signal). As described above, in the exemplary embodiment, the information processing system 1 can communicate with another apparatus via the cradle 5. It should be noted that the connection processing section 136 may be able to change the communication speed, or supply power to the apparatus connected to the extension terminal 137.

As describe above, in the information processing system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle 5 and thereby can output an image (and a sound) to the stationary monitor 6. A description is given below using the information processing system in use forms in which an image (and a sound) is output to the stationary monitor 6 by attaching the main body apparatus 2 alone to the cradle 5 in the state where the left controller 3 and the right controller 4 are detached from the main body apparatus 2.

As described above, in the exemplary embodiment, the information processing system 1 can also be used in the state where the left controller 3 and the right controller 4 are detached from the main body apparatus 2 (referred to as a "separate state"). As a form in a case where an operation is performed on an application (e.g., a game application) using the information processing system 1 in the separate state, a form in which a single user uses both the left controller 3 and the right controller 4 is possible. It should be noted that when a single user uses both the left controller 3 and the right controller 4, the user can also use an accessory device (e.g., an extension grip 210) for joining the left controller 3 and the right controller 4 to cause the left controller 3 and the right controller 4 to function as a single operation device. Further, as another form in a case where the an operation is performed on an application (e.g., a game application) using the information processing system 1 in the separate state, a form in which a single user uses one of the left controller 3 and the right controller 4 is possible. It should be noted that when a plurality of users perform operations using the same application in this use form, a form is possible in which each of the plurality of users uses one of the left controller 3 and the right controller 4, or a form is possible in which a plurality of sets of the left controller 3 and the right controller 4 are prepared, and each user uses one of the plurality of sets.

Figure 11:
FIG. 11 is a diagram showing a non-limiting example of the state where a single user uses the information processing system 1 by holding a set of the left controller 3 and the right controller 4 in a separate state.
Figure 13:
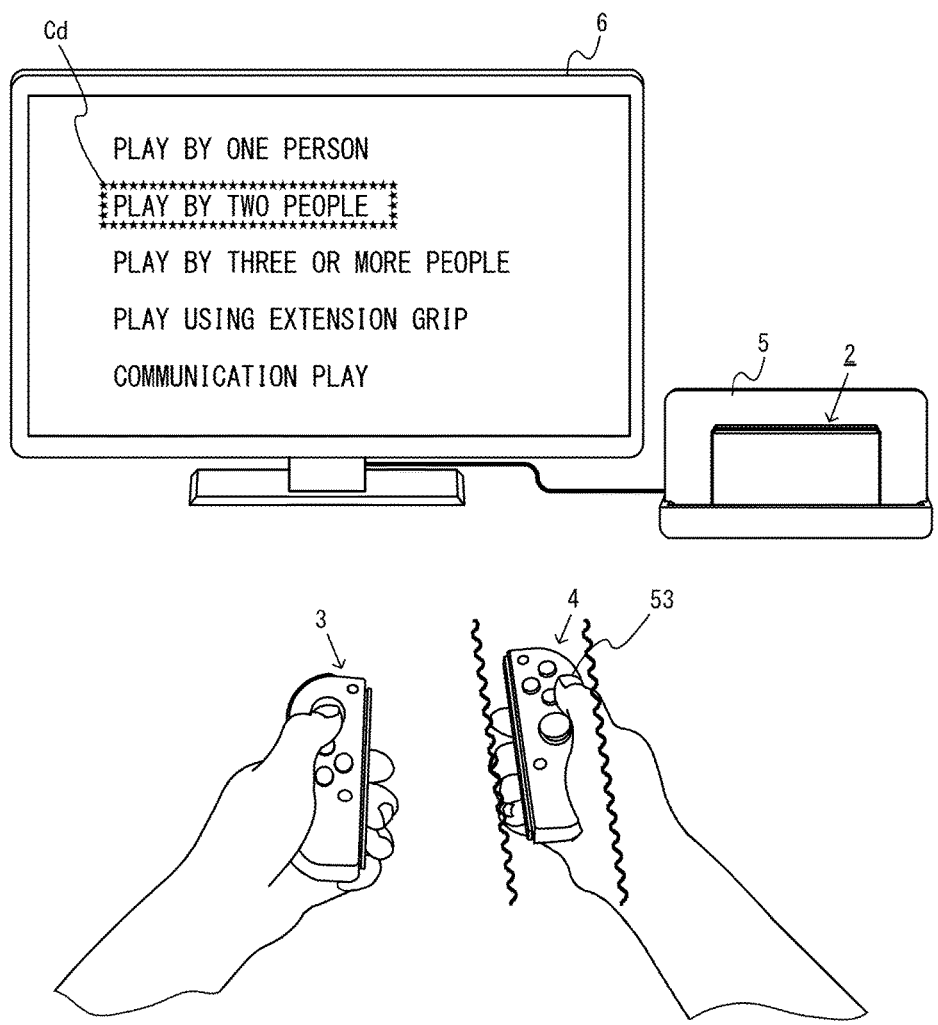
FIG. 13 is a diagram showing a non-limiting example of the state where a single user uses the information processing system 1 by holding the set of the left controller 3 and the right controller 4 in the separate state.

FIGS. 11 to 13 are diagrams showing an example of the state where a single user uses the information processing system 1 by holding a set of the left controller 3 and the right controller 4 in the separate state. As shown in FIGS. 11 to 13, in the separate state, the user can view an image displayed on the stationary monitor 6 while operating the left controller 3 and the right controller 4 by holding the left controller 3 with their left hand and the right controller 4 with their right hand.

For example, in the exemplary embodiment, the user holds the left controller 3 with their left hand such that the up direction of the longitudinal direction of the left controller 3 (the positive y-axis direction shown in FIG. 1), which is vertically long and approximately plate-shaped, is the front direction, and also the main surface of the left controller 3, on which the analog stick 32 and the like are provided, is directed upward. That is, the left controller 3 held with the left hand of the user is in the state where the positive y-axis direction is directed in the forward direction of the user, and the positive z-axis direction is directed downward. Further, the user holds the right controller 4 with their right hand such that the up direction of the longitudinal direction of the right controller 4 (the positive y-axis direction) shown in FIG. 1), which is vertically long and approximately plate-shaped, is the front direction, and also the main surface of the right controller 4, on which the analog stick 52 and the like are provided, is directed upward. That is, the right controller 4 held with the right hand of the user is also in the state where the positive y-axis direction is directed in the forward direction of the user, and the positive z-axis direction is directed downward.

As described above, an operation is performed using the operation buttons and the sticks provided in the left controller 3 and the right controller 4 in the state where the left controller 3 is held with the left hand, and the right controller 4 is held with the right hand. As shown in FIG. 11, in this example of information processing, a menu screen urging the user to make a selection from a plurality of options is displayed on the stationary monitor 6 before a game is started. Then, the user operating the left controller 3 and the right controller 4 operates the operation buttons and the sticks of the left controller 3 and/or the right controller 4 and thereby can perform the operation of changing an option to be selected from a menu displayed on the menu screen, and the operation of determining a selected option.

For example, on the menu screen illustrated in FIG. 11, a cursor C is displayed, which indicates that "play by one person" is selected among a plurality of options. In such a state, when the analog stick 32 of the left controller 3 is subjected to a tilt operation, a selected option is changed in accordance with the direction in which the tilt operation is performed. For example, as shown in FIG. 12, when the analog stick 32 of the left controller 3 is subjected to a tilt operation in the down direction (the negative y-axis direction shown in FIG. 1), a selection target is changed to the next option displayed below. By this operation of changing the option, on the menu screen illustrated in FIG. 12, the state where "play by one person" is selected changes to the state where "play by two people" is selected. The position of the cursor C moves to the position where the cursor C indicates that "play by two people" is selected.

Further, when the A-button 53 of the right controller 4 is subjected to a pressing operation, a selected option is determined. For example, as shown in FIG. 13, when the A-button 53 of the right controller 4 is subjected to a pressing operation in the state where "play by two people" is selected, the selection of "play by two people" from the plurality of options is determined, and the processing shifts to processing corresponding to this determination. By the operation of determining this option, on the menu screen illustrated in FIG. 13, a determination cursor Cd, which indicates that "play by two people" is determined from a plurality of options, is displayed at the position where the determination cursor Cd surrounds the option in a display form obtained by changing that of the cursor C.

Further, when the B-button 54 of the right controller 4 is subjected to a pressing operation, the processing is cancelled. For example, when the B-button 54 of the right controller 4 is subjected to a pressing operation in the state where the menu screen is displayed, the process of returning to the previous screen is performed, and an image displayed before the menu screen is displayed is display again.

In the exemplary embodiment, when information processing is performed by the user holding the left controller 3 and the right controller 4, vibrations are imparted to the left controller 3 and/or the right controller 4 in accordance with the content of the processing. As described above, the left controller 3 includes the vibrator 107, and the right controller 4 includes the vibrator 117. The CPU 81 of the main body apparatus 2 transmits vibration data to the left controller 3 and/or the right controller 4 in accordance with the content of processing corresponding to operations on the left controller 3 and/or the right controller 4 and thereby can vibrate the vibrator 107 and/or the vibrator 117 at an amplitude and a frequency corresponding to the vibration data.

As an example, in the exemplary embodiment, when the operation of changing a selected option is performed in the state where the menu screen is displayed, a controller subjected to the operation vibrates in accordance with the operation. For example, when a selected option is changed by performing a tilt operation on the analog stick 32 of the left controller 3, vibration data corresponding to the change of the option is generated using as a trigger the fact that the tilt operation becomes valid, and the vibration data is transmitted from the main body apparatus 2 to the left controller 3. Consequently, if the operation of changing an option is performed using the left controller 3, the left controller 3 vibrates in accordance with vibration data received from the main body apparatus 2.

Further, in the exemplary embodiment, when the operation of determining a selected option is performed in the state where the menu screen is displayed, a controller subjected to the operation vibrates in accordance with the operation. For example, when the selection of an option is determined by performing a pressing operation on the A-button 53 of the right controller 4, vibration data corresponding to the determination of the option is generated using as a trigger the fact that the pressing operation becomes valid, and the vibration data is transmitted from the main body apparatus 2 to the right controller 4. Consequently, if the operation of determining an option is performed using the right controller 4, the right controller 4 vibrates in accordance with vibration data received from the main body apparatus 2.

It should be noted that in the exemplary embodiment, when the operation of cancelling the processing is performed in the state where the menu screen is displayed, the right controller 4 may not be vibrated, or the right controller 4 may be vibrated in accordance with this operation.

Here, in the exemplary embodiment, to a controller subjected to the operation of changing a selected option or a controller subjected to the operation of determining an option, a vibration which starts or of which a local maximum value of the amplitude arrives after a predetermined time elapses since the timing when the operation is performed may be imparted. Further, the vibration of the controller corresponding to the operation of changing a selected option and the vibration of the controller corresponding to the operation of determining an option may be different vibrations. For example, the above vibrations may be different in at least one of the magnitude of the amplitude, the frequency, the vibration period, the time intervals at which the vibration is intermittently imparted, and the vibration start timing. With reference to FIGS. 14 and 15, a description is given below of the vibration of the controller corresponding to each operation. It should be noted that FIG. 14 is a diagram showing an example of the vibration of a controller corresponding to the operation of changing a selected option. FIG. 15 is a diagram showing an example of the vibration of a controller corresponding to the operation of determining an option.

In FIG. 14, when the operation of changing a selected option is performed using a controller, and the point in time when the main body apparatus 2 receives operation data indicating that this operation becomes valid is 0, vibration data for imparting a vibration of which the magnitude of the amplitude changes and the frequency is constant in 0.03 seconds from this point in time is transmitted from the main body apparatus 2 to the controller. Here, the point in time when the operation becomes valid is the point in time when the operation of changing the selected option becomes valid. Specifically, when the selected option is changed by a tilt operation on the analog stick 32, the tilt angle reaches a threshold for determining that the tilt direction of the analog stick 32 is the direction in which an option can be changed, and the selected option is to be changed, whereby it is determined that a valid operation is performed. That is, even when a tilt operation is performed on the analog stick 32, but when the analog stick 32 is tilted in the direction in which an option cannot be changed (e.g., to the left or right where no option is displayed, in the example of FIG. 11), or when the analog stick 32 is tilted at an angle that does not reach the threshold, it is not determined that a valid operation is performed.

When the operation of changing the selected option is performed, the magnitude of the amplitude of the vibration is 0 until a first time elapses (e.g., 0.0225 seconds elapse) since the point in time when this operation is performed. Then, after the first time elapses, the magnitude of the amplitude increases from 0 to 0.17. Then, the magnitude of the amplitude is maintained at 0.17 until a second time elapses (a longer time than the first time, e.g., 0.03 seconds, elapses) since the point in time when the operation is performed. Then, after the second time elapses, the magnitude of the amplitude becomes 0. On the other hand, when the operation of changing the selected option is performed, the frequency of the vibration is maintained at a constant frequency of 200 Hz from the first time to the second time. That is, when the operation of changing a selected option is performed using a controller, then using this operation as a trigger, a vibration of which the amplitude and the frequency are constant after a predetermined time elapses is imparted to the controller for a predetermined period.

In FIG. 15, when the operation of determining a selected option is performed using a controller, and the point in time when the main body apparatus 2 receives operation data indicating that this operation becomes valid is 0, vibration data for imparting a vibration of which the magnitude of the amplitude and the frequency change in 0.06 seconds from the point in time is transmitted from the main body apparatus 2 to the controller. Here, the point in time when the operation becomes valid is the point in time when the operation of determining the selected option becomes valid. Specifically, when the selected option is determined by a pressing operation on the A-button 53, the A-button 53 is pressed until the A-button 53 changes from an off state to an on state, whereby it is determined that a valid operation is performed. That is, even when the A-button 53 is pressed, but when the A-button 53 maintains the off state or the on state, or when the A-button 53 changes from the on state to the off state, it is not determined that a valid operation is performed.

When the operation of determining the selected option is performed, the magnitude of the amplitude of the vibration increases from 0 to 0.25 in a gradually increasing manner until a third time elapses (e.g., 0.03 seconds elapse) since the point in time when this operation is performed. Then, the magnitude of the amplitude decreases from 0.25 to 0 in a gradually increasing manner until a fourth time elapses (a longer time than the third time, e.g., 0.06 seconds, elapses) since the third time elapses. On the other hand, when the operation of determining the selected option is performed, the frequency of the vibration is maintained at a constant frequency of 160 Hz until the third time elapses since the point in time when this operation is performed. Then, the frequency increases from 160 Hz to 300 Hz in a gradually increasing manner until the fourth time elapses since the third time elapses. That is, when the operation of determining a selected option is performed using a controller, then using this operation as a trigger, a vibration of which the amplitude and the frequency change and also a local maximum value of the amplitude arrives after a predetermined time elapses since this operation is imparted to the controller for a predetermined period.

As described above, when a controller is vibrated in accordance with an operation using two controllers, the controller subjected to this operation vibrates. Thus, it is possible to impart an appropriate vibration corresponding to the operation to the controller. Further, to the controller, a vibration which starts or of which a local maximum value of the amplitude arrives after a predetermined time elapses since the timing when the operation is performed is imparted. The controller subjected to the operation thus vibrates, thereby facilitating the distinction between the vibration and a vibration generated in the controller due to the motions of the operation sections. Thus, the user feels a vibration more easily than in a case where a vibration is imparted at the same timing as this operation, and it is possible to impart a more appropriate vibration to the controller. Further, different vibrations are imparted to controllers in accordance with the content of information processing to be performed in accordance with operations, whereby it is possible to variedly vibrate each controller.

It should be noted that the above vibration is merely illustrative. Alternatively, another vibration may be imparted to a controller. For example, a controller subjected to the operation of determining a selected option may vibrate in the vibration pattern exemplified in FIG. 14 imparted to a controller when a selected option is changed. Yet alternatively, a controller subjected to the operation of changing a selected option may vibrate in the vibration pattern exemplified in FIG. 15 imparted to a controller when a selected option is determined.

Further, even when the same operation is performed using the left controller 3 or the right controller 4, different vibrations may be imparted to the operated controller. For example, when the A-button 53 of the right controller 4 is subjected to a pressing operation, a vibration to be imparted to the right controller 4 is selected from a plurality of vibration patterns in accordance with the content of information processing to be executed by the pressing operation. Specifically, in the case of information processing using the above menu screen, when the A-button 53 is subjected to a pressing operation for determining an option that can be determined from a plurality of options, then using this pressing operation as a trigger, the vibration exemplified in FIG. 15 is imparted to the right controller 4. On the other hand, when the A-button 53 is subjected to a pressing operation for determining an option that cannot be determined from a plurality of options, a warning sound indicating that this determination cannot be made is immediately output, and also a vibration corresponding to this warning sound is immediately imparted to the right controller 4. In this case, a vibration waveform may be generated based on the sound waveform of a warning sound to be output, and vibration data for vibrating the right controller 4 based on the vibration waveform may be transmitted to the right controller 4. As another example, the form may be such that when the A-button 53 is subjected to a pressing operation for determining an option that cannot be determined from a plurality of options, a vibration corresponding to the pressing operation is not imparted to the right controller 4, and the right controller 4 does not vibrate.

Further, when the analog stick 32 of the left controller 3 is subjected to a tilt operation, it is possible that in accordance with the content of information processing to be executed by the tilt operation, a vibration to be imparted to the left controller 3 is selected from a plurality of vibration patterns. Specifically, in the case of information processing using the above menu screen, when a tilt operation for indicating the direction in which an option can be changed to another option is performed using the analog stick 32, then using the tilt operation as a trigger, the vibration exemplified in FIG. 14 is imparted to the left controller 3. On the other hand, when a tilt operation for indicating the direction in which an option to which a change can be made using the analog stick 32 is not displayed, or the direction in which an option that cannot be selected is displayed is performed, a warning sound indicating that this change cannot be made is immediately output, and also a vibration corresponding to the warning sound is immediately imparted to the left controller 3. As another example, the form may be such that when a tilt operation for indicating the direction in which an option can be changed to another option is performed using the analog stick 32, a vibration corresponding to the tilt operation is not imparted to the left controller 3, and the left controller 3 does not vibrate.

As described above, in the above example, even when the same operation is performed using the left controller 3 or the right controller 4, then based on information processing to be executed in accordance with the operation, it is determined whether or not the controller is to be vibrated in accordance with the operation, and whether or not the vibration is to be delayed from the operation in a case where the controller is to be vibrated, and a vibration pattern in a case where the controller is to be vibrated is determined. Then, vibration data based on these determinations is generated. Consequently, the left controller 3 or the right controller 4 receiving the above vibration data vibrates in accordance with the vibration data, whereby, even when the same operation is performed, for example, the controller may not vibrate, or may vibrate by being delayed from the operation, or may vibrate immediately after the operation, or may vibrate in different vibration patterns. Thus, it is possible to appropriately vibrate each controller in accordance with the content of information processing. Further, when the left controller 3 or the right controller 4 is vibrated in different vibration patterns, not only the magnitude of the amplitude and the frequency, but also the vibration period, the time intervals at which the vibration is intermittently imparted, the vibration start timing, and the like may be different.

Figure 16:
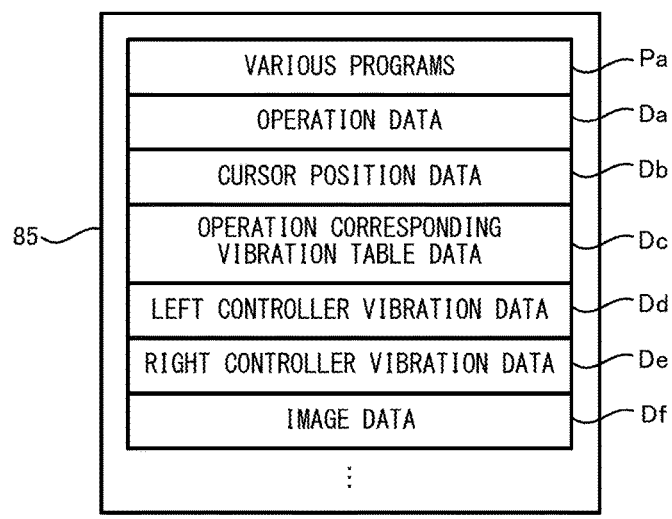
FIG. 16 is a diagram showing a non-limiting example of a data area set in a DRAM 85 of the main body apparatus 2.

Next, with reference to FIGS. 16 and 17, a description is given of an example of specific processing executed by the information processing system 1 according to the exemplary embodiment. FIG. 16 is a diagram showing an example of a data area set in the DRAM 85 of the main body apparatus 2 according to the exemplary embodiment. It should be noted that in the DRAM 85, in addition to data shown in FIG. 16, data used for other processes is also stored, but is not described in detail here.

In a program storage area of the DRAM 85, various programs Pa, which are executed by the information processing system 1, are stored. In the exemplary embodiment, as the various programs Pa, a communication program for wirelessly communicating with the left controller 3 and the right controller 4, an application program for performing information processing (e.g., game processing) based on data acquired from the left controller 3 and/or the right controller 4, a vibration control program for vibrating the left controller 3 and/or the right controller 4, and the like are stored. It should be noted that the various programs Pa may be stored in advance in the flash memory 84, or may be acquired from a storage medium attachable to and detachable from the information processing system 1 (e.g., the first type storage medium attached to the first slot 23 or the second type storage medium attached to the second slot 24) and stored in the DRAM 85, or may be acquired from another apparatus via a network such as the Internet and stored in the DRAM 85. The CPU 81 executes the various programs Pa stored in the DRAM 85.

In a data storage area of the DRAM 85, various data used for processes such as a communication process, information processing, and the like executed by the information processing system 1 is stored. In the exemplary embodiment, in the DRAM 85, operation data Da, cursor position data Db, operation corresponding vibration table data Dc, left controller vibration data Dd, right controller vibration data De, image data Df, and the like are stored.

The operation data Da is operation data appropriately acquired from each of the left controller 3 and/or the right controller 4. As described above, operation data transmitted from each of the left controller 3 and/or the right controller 4 includes information regarding an input (specifically, information regarding an operation or the detection result of each sensor) from each input section (specifically, each button, an analog stick, and each sensor). In the exemplary embodiment, operation data is transmitted from each of the left controller 3 and/or the right controller 4 in a predetermined cycle through wireless communication, and the operation data Da is appropriately updated using the received operation data. It should be noted that the update cycle of the operation data Dc may be such that the operation data Da is updated every frame, which is the cycle of the processing described later performed by the information processing system 1, or is updated every cycle in which operation data is transmitted through the above wireless communication.

The cursor position data Db is data indicating the position and the direction of the cursor C or the determination cursor Cd.

The operation corresponding vibration table data Dc is data indicating an operation corresponding vibration table in which an operation and a vibration waveform (a vibration pattern) corresponding to information processing to be performed corresponding to the operation are described.

The left controller vibration data Dd is data indicating a vibration for vibrating the left controller 3. The right controller vibration data De is data indicating a vibration for vibrating the right controller 4.

The image data Df is data for displaying the menu screen (e.g., an option image, a cursor image, a background image, and the like) on the display 12 of the main body apparatus 2 or the display screen of the stationary monitor 6.

Next, with reference to FIG. 17, a detailed example of information processing (a menu selection process) according to the exemplary embodiment is described. FIG. 17 is a flow chart showing an example of information processing executed by the information processing system 1. In the exemplary embodiment, a series of processes shown in FIG. 17 is performed by the CPU 81 executing the communication program and a predetermined application program (an information processing program or a game program) included in the various programs Pa. Further, the information processing shown in FIG. 17 is started at any timing.

It should be noted that the processes of all of the steps in the flow chart shown in FIG. 17 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the CPU 81 performs the processes of all of the steps in the flow chart. Alternatively, a processor or a dedicated circuit other than the CPU 81 may perform the processes of some of the steps in the flow chart. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIG. 17 may be executed by the cooperation of a plurality of information processing apparatuses including the main body apparatus 2.

In FIG. 17, the CPU 81 performs initialization in the information processing (step S141), and the processing proceeds to the next step. For example, in the initialization, the CPU 81 initializes parameters for performing the processing described below. Further, in the initialization, the CPU 81 sets an operation method and a set of the left controller 3 and the right controller 4 to be used by the user. As an example, when controllers to be used by the user are settled by simultaneously operating the left controller 3 and the right controller 4 or performing a predetermined pairing process before the menu selection process is started, the CPU 81 initializes an operation method for performing an operation using the left controller 3 and the right controller 4 as a set. As another example, the CPU 81 displays, on the display 12 of the main body apparatus 2 or the display screen of the stationary monitor 6, options urging the user to select an operation method before the menu selection process is started. Then, when the operation of selecting any one of the options is performed, the CPU 81 initializes the operation method in which the left controller 3 and the right controller 4 subjected to the selection operation are selected as a set.

Next, the CPU 81 performs the process of displaying the menu screen on a display screen of a display device (e.g., the stationary monitor 6) (step S142), and the processing proceeds to the next step. For example, the CPU 81 generates images representing a plurality of options urging the user to make a selection and displays the images on the display screen. Further, the CPU 81 sets at a default position an image of the cursor C indicating a selected option at the current moment, thereby updating the cursor position data Db. Then, the CPU 81 places the cursor C at this position and displays the cursor C on the display screen.

Next, the CPU 81 acquires operation data from the left controller 3 and/or the right controller 4 and updates the operation data Da (step S143), and the processing proceeds to the next step.

Next, the CPU 81 determines whether or not an operation using the left controller 3 or the right controller 4 is performed (step S144). For example, with reference to the operation data Da acquired in the above step S143, the CPU 81 determines whether or not an operation using the left controller 3 or the right controller 4 is performed.

Next, the CPU 81 determines whether or not a valid operation for changing the selected option is performed by the user (step S145). For example, with reference to the operation data Da acquired in the above step S143, when a valid tilt operation capable of changing the option is performed using the analog stick 32 of the left controller 3, the determination is affirmative in the above step S145. Then, when a valid operation for changing the selected option is performed, the processing proceeds to step S146. On the other hand, when a valid operation for changing the selected option is not performed, the processing proceeds to step S148.

In step S146, the CPU 81 changes the selected option in accordance with the operation, and the processing proceeds to the next step. For example, with reference to the cursor position data Db, the CPU 81 acquires the position of the cursor C and determines, as an option after the change, an option closest to the position of the cursor C among options displayed in the direction in which the analog stick 32 is subjected to the tilt operation from the position of the cursor C. Then, the CPU 81 changes the position of the cursor C to a position where the cursor C surrounds the option after the change. Then, the CPU 81 updates the cursor position data Db using the position of the cursor C after the change.

Next, the CPU 81 performs the process of generating vibration data (step S147), and the processing proceeds to step S152. For example, with reference to the operation corresponding vibration table data Dc, the CPU 81 extracts a vibration waveform (a vibration pattern) corresponding to information processing for changing the selected option, and based on the vibration waveform, generates vibration data for vibrating the controller (e.g., the left controller 3) subjected to this change operation, thereby updating the left controller vibration data Dd or the right controller vibration data De (e.g., the left controller vibration data Dd) corresponding to the controller. As an example, when the option is changed by an operation on the analog stick 32 of the left controller 3, vibration data for vibrating the left controller 3 based on a vibration waveform (a vibration pattern) as exemplified in FIG. 14 is set in the left controller vibration data Dd.

On the other hand, when it is determined in the above step S145 that a valid operation for changing the selected option is not performed, then in step S148, the CPU 81 determines whether or not a valid operation for determining the selected option is performed by the user. For example, with reference to the operation data Da acquired in the above step S143, when a valid pressing operation for determining the option is performed using the A-button 53 of the right controller 4, the determination is affirmative in the above step S148. Then, when a valid operation for determining the selected option is performed, the processing proceeds to step S149. On the other hand, when a valid operation for determining the selected option is not performed, the processing proceeds to step S151.

In step S149, the CPU 81 determines the selected option in accordance with the operation, and the processing proceeds to the next step. For example, with reference to the cursor position data Db, the CPU 81 acquires the position of the cursor C, determines the selection of the option surrounded by the cursor C, and prepares to perform information processing based on this determination. Further, the CPU 81 changes the display form of the cursor C displayed at the position of the cursor C to that of the determination cursor Cd.

Next, the CPU 81 performs the process of generating vibration data (step S150), and the processing proceeds to step S152. For example, with reference to the operation corresponding vibration table data Dc, the CPU 81 extracts a vibration waveform (a vibration pattern) corresponding to information processing for determining the selected option, and based on the vibration waveform, generates vibration data for vibrating the controller (e.g., the right controller 4) subjected to this change operation, thereby updating the left controller vibration data Dd or the right controller vibration data De (e.g., the right controller vibration data De) corresponding to the controller. As an example, when the option is determined by an operation on the A-button 53 of the right controller 4, vibration data for vibrating the right controller 4 based on a vibration waveform (a vibration pattern) as exemplified in FIG. 15 is set in the right controller vibration data De.

On the other hand, when it is determined in the above step S148 that a valid operation for determining the selected option is not performed, then in step S151, the CPU 81 performs processing corresponding to the operation of the user, and the processing proceeds to step S152. As an example, with reference to the operation data Da acquired in the above step S143, when the operation of determining an option that cannot be determined is performed by the user, the CPU 81 performs the process of immediately outputting a warning sound indicating that this determination cannot be made. Further, with reference to the operation corresponding vibration table data Dc, the CPU 81 extracts a vibration waveform corresponding to processing by which the option that cannot be determined is determined (e.g., a vibration waveform based on which a vibration corresponding to the warning sound is immediately imparted to the controller subjected to the operation), and based on the vibration waveform, generates vibration data for vibrating the controller subjected to the invalid determination operation, thereby updating the left controller vibration data Dd or the right controller vibration data De corresponding to the controller. As another example, with reference to the operation data Da acquired in the above step S143, when the operation of cancelling the processing (e.g., a pressing operation on the B-button 54 of the right controller 4) is performed by the user, the CPU 81 prepares to perform information processing corresponding to this cancellation (e.g., the process of returning to the previous screen). In this case, the controller subjected to the cancellation operation is not vibrated, and therefore, the process of updating the left controller vibration data Dd or the right controller vibration data De may not be performed.

In step S152, the CPU 81 performs a display control process, and the processing proceeds to the next step. For example, using the cursor position data Db, the CPU 81 places the cursor C or the determination cursor Cd so as to surround any one of the plurality of displayed options. Then, the CPU 81 generates a menu screen on which the cursor C or the determination cursor Cd is placed. Then, the CPU 81 performs the process of displaying the menu screen on the display screen of the display device (e.g., the stationary monitor 6).

Next, the CPU 81 performs the process of, in each cycle of transmitting vibration data, transmitting vibration data corresponding to this cycle to the left controller 3 and the right controller 4 (step S153), and the processing proceeds to the next step. For example, with reference to the left controller vibration data Dd, the CPU 81 transmits vibration data for a vibration length corresponding to the transmission cycle to the left controller 3. Further, with reference to the right controller vibration data De, the CPU 81 transmits vibration data for a vibration length corresponding to the transmission cycle to the right controller 4. The vibration data for each controller is thus transmitted, whereby each of the left controller 3 and the right controller 4 receiving the vibration data vibrates based on vibration waveforms corresponding to the vibration data.

Next, the CPU 81 determines whether or not the menu selection process is to be ended (step S154). In the above step S154, examples of a condition for ending the menu selection process include: the fact that the operation of determining the selection of any one of the options is performed, whereby the processing shifts to information processing corresponding to the determined option; the fact that the operation of cancelling the processing is performed, the processing returns to information processing performed before the menu selection process is performed; and the fact that the user performs the operation of ending the menu selection. When the menu selection is not to be ended, the processing returns to the above step S143, and the process of step S145 is repeated. When the menu selection is to be ended, the processing of the flow chart ends. Hereinafter, the series of processes of steps S143 to S154 are repeatedly executed until it is determined in step S154 that the menu selection process is to be ended.

As described above, in the exemplary embodiment, when an operation is performed using both the left controller 3 and the right controller 4, a controller subjected to a valid operation vibrates using this operation as a trigger. Thus, it is possible to impart an appropriate vibration corresponding to the operation to the controller. Further, it is possible to impart to the controller a vibration which starts or of which a local maximum value of the amplitude arrives after a predetermined time elapses since the timing when the operation is performed. Thus, the user holding the controller subjected to the operation easily distinguishes the vibration from a vibration generated in the controller due to the motions of the operation sections. Thus, the user feels a vibration more easily than in a case where a vibration is imparted at the same timing as this operation. Further, different vibrations are imparted to controllers in accordance with the content of information processing to be performed in accordance with operations, whereby it is possible to variedly vibrate each controller.

It should be noted that in the above exemplary embodiment, an example is described where based on the timing when an operation is performed, the timing when a vibration starts or the timing when a local maximum value of the amplitude of the vibration arrives is delayed. Alternatively, the delay of the vibration is also possible based on different timing. For example, when an operation sound (a sound effect) corresponding to a user operation is output, generally, it is possible to interpret the timing when the operation is performed and the timing when the output of the operation sound is started as being almost the same. Further, when a display content displayed on the display screen changes in accordance with a user operation (for example, a display object moves, the display form changes, or the like), generally, it is possible to interpret the timing when the operation is performed and the timing when a change in the display content is started as being almost the same. Based on such interpretations, in a vibration in the exemplary embodiment, the timing when the vibration starts or the timing when a local maximum value of the amplitude of the vibration arrives is delayed using as a reference (a trigger) the timing when the output of the operation sound (the sound effect) to be output in accordance with the operation is started or the timing when a change in the display content of the display screen to change in accordance with the operation is started. Further, when an operation is performed using a single controller, the timing when a vibration starts or the timing when a local maximum value of the amplitude of the vibration arrives may be delayed with respect to a change in operation timing, an operation sound (a sound effect), and/or a display content.

Further, in the above exemplary embodiment, an example is described where when an operation is performed using both the left controller 3 and the right controller 4, a controller subjected to a valid operation vibrates using the operation as a trigger. Alternatively, the controller may vibrate using different timing corresponding to the operation as a trigger. For example, the state where one of the left controller 3 and the right controller 4 subjected to a valid operation is operated shifts to the state where the controller is not operated, then using as a trigger the fact that the state where the controller is operated shifts to the state where the controller is not operated, the controller subjected to the shifting may vibrate. Specifically, when a valid operation is performed on an analog stick, then using as a trigger the fact that the state where the analog stick is operated shifts to the state where the analog stick is not operated, a controller including the analog stick may be vibrated. Yet alternatively, when a valid operation is performed on an operation button, then using as a trigger the fact that the state where the operation button is subjected to a pressing operation shifts to the state where the operation button is not subjected to the pressing operation, a controller including the operation button may be vibrated.

Further, in the above exemplary embodiment, an example has been used where a single user uses both the left controller 3 and the right controller 4. Alternatively, the form may be such that a single user performs an operation by holding one of the left controller 3 and the right controller 4. Yet alternatively, a plurality of users each perform an operation using both or one of the left controller 3 and the right controller 4. In this case, regarding the left controller 3 and/or the right controller 4 used by each of the users, a vibration corresponding to the operation of the user may be imparted to the controllers operated by the user.

Further, when a plurality of users use both or one of the left controller 3 and the right controller 4, it is also possible to impart the same vibration to the controllers operated by each of the users. For example, it is possible that when a plurality of users each select and determine a single option by viewing the same menu screen, then using an operation of any one of the users as a trigger, the same vibration is imparted to both or one of the left controller 3 and the right controller 4 held by each user.

Further, in the above exemplary embodiment, the main body apparatus 2 performs the process of generating vibration data of the left controller 3 and vibration data of the right controller 4. Alternatively, another apparatus may perform this process. For example, a controller to vibrate using vibration data may perform the process of generating this vibration data.

Further, in another exemplary embodiment, the main body apparatus 2 may be able to directly communicate with the stationary monitor 6. For example, the main body apparatus 2 and the stationary monitor 6 may be able to directly perform wired communication with each other, or directly perform wireless communication with each other. In this case, based on whether or not the main body apparatus 2 and the stationary monitor 6 can directly communicate with each other, the main body apparatus 2 may determine the display destination of an image.

Further, the information processing system 1 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the information processing system 1 performs information processing (a menu selection process) and a communication process. Alternatively, another apparatus may perform at least some of the processing steps. For example, if the information processing system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing can be performed by a processor or the cooperation of a plurality of processors, the processor or the plurality of processors included in an information processing system including at least one information processing apparatus. Further, in the above exemplary embodiment, information processing can be performed by the CPU 81 of the information processing system 1 executing a predetermined program. Alternatively, part or all of the processing of the flow chart may be performed by a dedicated circuit included in the information processing system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the information processing system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an information processing system, an information processing apparatus, an information processing program, an information processing method, and the like that are capable of, in a system where an operation can be performed using an operation device, imparting an appropriate vibration in accordance with an operation using the operation device.

What is claimed is:

1. An information processing system including a first operation device including a first vibrator, a second operation device including a second vibrator, and an information processing apparatus configured to communicate with each of the first operation device and the second operation device,
the first operation device comprising:
   a direction input unit in a housing of the first operation device; and
   a computer processor configured to:
      transmit first operation data corresponding to an operation on the direction input unit to the information processing apparatus,
the second operation device comprising:
   a press button in a housing of the second operation device; and
   a computer processor configured to:
      transmit second operation data corresponding to an operation on the press button to the information processing apparatus,
the information processing apparatus comprising a computer processor configured to:
   set an operation method using the first operation device and the second operation device as a set;
   acquire the first operation data and the second operation data;
   generate first vibration data using the first operation data and generate second vibration data using the second operation data; and
   transmit the first vibration data to the first operation device and transmit the second vibration data to the second operation device set in the same set as the first operation device in the setting of the operation method,
the computer processor of the first operation device further configured to:
   vibrate the first vibrator in accordance with the first vibration data,
the computer processor of the second operation device further configured to:
   vibrate the second vibrator in accordance with the second vibration data,
the computer processor of the information processing apparatus is further configured to:
   perform information processing for selecting any one of a plurality of items in accordance with the first operation data and determining the selected item in accordance with the second operation data.

2. The information processing system according to claim 1, wherein
   in the generation of the vibration data, the first vibration data is generated using as a trigger the fact that a valid operation is performed on the direction input unit using the first operation data, and the second vibration data is generated using as a trigger the fact that a valid operation is performed on the press button using the second operation data.

3. The information processing system according to claim 1, wherein
   the direction input unit includes an analog stick for outputting the first operation data corresponding to a tilt direction and a tilt angle of the stick operated by a user.

4. The information processing system according to claim 1, wherein
   a vibration waveform indicated by the first vibration data is different from a vibration waveform indicated by the second vibration data.

5. The information processing system according to claim 4, wherein
   the vibration waveform indicated by the first vibration data is different from the vibration waveform indicated by the second vibration data in at least one of a magnitude of an amplitude, a frequency, a vibration period, time intervals at which a vibration is intermittently imparted, and vibration start timing.

6. The information processing system according to claim 2, wherein
   in the generation of the vibration data, at least one of the first vibration data and the second vibration data is generated such that a vibration starts after a predetermined time elapses since the trigger.

7. The information processing system according to claim 2, wherein
   in the generation of the vibration data, at least one of the first vibration data and the second vibration data is generated such that a local maximum value of an amplitude of the vibration arrives after a predetermined time elapses since the trigger.

8. The information processing system according to claim 1, wherein
   the computer processor of the information processing apparatus is further configured to:
      generate and output a first sound effect using as a trigger the fact that a valid operation is performed on the direction input unit, and generate and output a second sound effect using as a trigger the fact that a valid operation is performed on the press button, and
   in the generation of the vibration data, the first vibration data is generated such that a vibration starts or a local maximum value of an amplitude of the vibration arrives after a predetermined time elapse since output of the first sound effect is started, and/or the second vibration data is generated such that a vibration starts or a local maximum value of an amplitude of the vibration arrives after a predetermined time elapses since output of the second sound effect is started.

9. The information processing system according to claim 1, wherein
   the first operation device and the second operation device are physically separate from each other.

10. The information processing system according to claim 1, wherein
    in the generation of the vibration data, the first vibration data is generated every time the selected item is changed, and the second vibration data is generated in accordance with the fact that the selected item is determined.

11. The information processing system according to claim 1, wherein
    in the performance of the information processing, the computer processor of the information processing apparatus is further configured to:
    perform game processing; and display a plurality of options on a display before a game to be subjected to the game processing is started, and in the generation of the vibration data, the first vibration data is generated every time the selected option is changed, and the second vibration data is generated in accordance with the fact that the selected option is determined.

12. The information processing system according to claim 1, wherein the computer processor of the information processing apparatus is further configured to:

perform first information processing in accordance with the first operation data and perform second information processing in accordance with the second operation data, and in the generation of the vibration data, the first vibration data is generated in accordance with a content of the first information processing, and the second vibration data is generated in accordance with a content of the second information processing.

13. An information processing apparatus capable of communicating with a first operation device including a first vibrator and a direction input unit, and a second operation device including a second vibrator and a press button, the information processing apparatus comprising a computer processor configured to:

set an operation method using the first operation device and the second operation device as a set;

acquire first operation data corresponding to an operation on the direction input unit from the first operation device and acquire second operation data corresponding to an operation on the press button from the second operation device;

generate first vibration data using the first operation data and generate second vibration data using the second operation data;

transmit the first vibration data to the first operation device, thereby vibrating the first vibrator in accordance with the first vibration data, and transmit the second vibration data to the second operation device set in the same set as the first operation device in the setting of the operation method, thereby vibrating the second vibrator in accordance with the second vibration data, and perform information processing for selecting any one of a plurality of items in accordance with the first operation data and determining the selected item in accordance with the second operation data.

14. A non-transitory computer-readable storage medium having stored therein an information processing program executed by a computer included in an information processing apparatus configured to communicate with a first operation device including a first vibrator and a direction input unit, and a second operation device including a second vibrator and a press button, the information processing program causing the computer to execute:

setting an operation method using the first operation device and the second operation device as a set;

acquiring first operation data corresponding to an operation on the direction input unit from the first operation device and acquiring second operation data corresponding to an operation on the press button from the second operation device;

generating first vibration data using the first operation data and generating second vibration data using the second operation data;

transmitting the first vibration data to the first operation device, thereby vibrating the first vibrator in accordance with the first vibration data, and transmitting the second vibration data to the second operation device set in the same set as the first operation device in the setting of the operation method, thereby vibrating the second vibrator in accordance with the second vibration data; and performing information processing for selecting any one of a plurality of items in accordance with the first operation data and determining the selected item in accordance with the second operation data.

15. An information processing method for performing information processing using a first operation device including a first vibrator and a direction input unit, and a second operation device including a second vibrator and a press button, the information processing method comprising:

setting an operation method using the first operation device and the second operation device as a set;

acquiring first operation data corresponding to an operation on the direction input unit from the first operation device and acquiring second operation data corresponding to an operation on the press button from the second operation device;

generating first vibration data using the first operation data and generating second vibration data using the second operation data;

transmitting the first vibration data to the first operation device, thereby vibrating the first vibrator in accordance with the first vibration data, and transmitting the second vibration data to the second operation device set in the same set as the first operation device in the setting of the operation method, thereby vibrating the second vibrator in accordance with the second vibration data; and performing information processing for selecting any one of a plurality of items in accordance with the first operation data and determining the selected item in accordance with the second operation data.

16. An information processing system including a first operation device including a first vibrator, a second operation device including a second vibrator, and an information processing apparatus configured to communicate with each of the first operation device and the second operation device, the first operation device comprising:

a direction input unit in a housing of the first operation device; and a computer processor configured to:

transmit first operation data corresponding to an operation on the direction input unit to the information processing apparatus, the second operation device comprising:

a press button in a housing of the second operation device; and a computer processor configured to:

transmit second operation data corresponding to an operation on the press button to the information processing apparatus, the information processing apparatus comprising a computer processor configured to:

set an operation method using the first operation device and the second operation device as a set;

acquire the first operation data and the second operation data;

generate first vibration data using the first operation data and generate second vibration data using the second operation data; and transmit the first vibration data to the first operation device and transmit the second vibration data to the second operation device set in the same set as the first operation device in the setting of the operation method, the computer processor of the first operation device further configured to:
vibrate the first vibrator in accordance with the first vibration data, the computer processor of the second operation device further configured to:
vibrate the second vibrator in accordance with the second vibration data;

wherein the computer processor of the information processing apparatus is further configured to:
generate and output a first sound effect using as a trigger the fact that a valid operation is performed on the direction input unit, and generate and output a second sound effect using as a trigger the fact that a valid operation is performed on the press button, and in the generation of the vibration data, the first vibration data is generated such that a vibration starts or a local maximum value of an amplitude of the vibration arrives after a predetermined time elapse since output of the first sound effect is started, and/or the second vibration data is generated such that a vibration starts or a local maximum value of an amplitude of the vibration arrives after a predetermined time elapses since output of the second sound effect is started.

17. An information processing apparatus capable of communicating with a first operation device including a first vibrator and a direction input unit, and a second operation device including a second vibrator and a press button, the information processing apparatus comprising a computer processor configured to:

set an operation method using the first operation device and the second operation device as a set;

acquire first operation data corresponding to an operation on the direction input unit from the first operation device and acquire second operation data corresponding to an operation on the press button from the second operation device;

generate first vibration data using the first operation data and generate second vibration data using the second operation data;

transmit the first vibration data to the first operation device, thereby vibrating the first vibrator in accordance with the first vibration data, and transmit the second vibration data to the second operation device set in the same set as the first operation device in the setting of the operation method, thereby vibrating the second vibrator in accordance with the second vibration data; and generate and output a first sound effect using as a trigger the fact that a valid operation is performed on the direction input unit, and generate and output a second sound effect using as a trigger the fact that a valid operation is performed on the press button, and wherein in the generation of the vibration data, the first vibration data is generated such that a vibration starts or a local maximum value of an amplitude of the vibration arrives after a predetermined time elapse since output of the first sound effect is started, and/or the second vibration data is generated such that a vibration starts or a local maximum value of an amplitude of the vibration arrives after a predetermined time elapses since output of the second sound effect is started.

18. An information processing method for performing information processing using a first operation device including a first vibrator and a direction input unit, and a second operation device including a second vibrator and a press button, the information processing method comprising:

setting an operation method using the first operation device and the second operation device as a set;

acquiring first operation data corresponding to an operation on the direction input unit from the first operation device and acquiring second operation data corresponding to an operation on the press button from the second operation device;

generating first vibration data using the first operation data and generating second vibration data using the second operation data;

transmitting the first vibration data to the first operation device, thereby vibrating the first vibrator in accordance with the first vibration data, and transmitting the second vibration data to the second operation device set in the same set as the first operation device in the setting of the operation method, thereby vibrating the second vibrator in accordance with the second vibration data; and generating and outputting a first sound effect using as a trigger the fact that a valid operation is performed on the direction input unit, and generating and outputting a second sound effect using as a trigger the fact that a valid operation is performed on the press button, and wherein in the generation of the vibration data, the first vibration data is generated such that a vibration starts or a local maximum value of an amplitude of the vibration arrives after a predetermined time elapse since output of the first sound effect is started, and/or the second vibration data is generated such that a vibration starts or a local maximum value of an amplitude of the vibration arrives after a predetermined time elapses since output of the second sound effect is started.

* * * * *